US012675165B2

(12) United States Patent
Dahlgren et al.

(10) Patent No.: US 12,675,165 B2
(45) Date of Patent: Jul. 7, 2026

(54) HAPTIC PROFILES FOR ELECTRONIC DEVICES

(71) Applicant: Telefonaktiebolaget LM Ericsson (publ), Stockholm (SE)

(72) Inventors: Fredrik Dahlgren, Lund (SE); Alexander Hunt, Tygelsjö (SE); Andreas Kristensson, Södra Sandby (SE); Sara Thorson, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/850,135

(22) PCT Filed: Mar. 25, 2022

(86) PCT No.: PCT/EP2022/058010
§ 371 (c)(1),
(2) Date: Sep. 24, 2024

(87) PCT Pub. No.: WO2023/179879
PCT Pub. Date: Sep. 28, 2023

(65) Prior Publication Data
US 2025/0216943 A1        Jul. 3, 2025

(51) Int. Cl.
*G06F 3/01*                (2006.01)

(52) U.S. Cl.
CPC .................................... *G06F 3/016* (2013.01)

(58) Field of Classification Search
CPC ........................................................ G06F 3/016
See application file for complete search history.

(56) References Cited

U.S. PATENT DOCUMENTS 9,715,281 B2        7/2017   Modarres et al.
10,762,752 B1       9/2020   Persson et al.
(Continued)

FOREIGN PATENT DOCUMENTS

EP          3 140 717 B1      7/2018
WO          2018/046937 A1    3/2018

OTHER PUBLICATIONS

International Search Report and Written Opinion issued in International Application No. PCT/EP022/058010 dated Nov. 18, 2022 (16 pages).
(Continued)

*Primary Examiner* — Robert J Michaud
(74) *Attorney, Agent, or Firm* — Rothwell, Figg, Ernst & Manbeck, P.C.

(57)        ABSTRACT

An electronic apparatus (200*a*) comprising: —an interactive area (201*a-c*) configured to provide one or more functions of the electronic apparatus (200*a*); —a sensing unit (202) configured to sense a touch and/or a proximity of an object (203) interacting with the interactive area (201*a-c*); —a response unit (204) configured to produce a tactile response from the interactive area (201*a-c*) to sensing the touch and/or proximity of the object (203); —a processing unit (206) comprising circuitry configured to urge the response unit (204) to produce the tactile response, wherein the tactile response corresponds to one of the one or more functions provided by the interactive area (201*a-c*) in response to an interaction with the interactive area (201*a-c*) after the tactile response is provided; characterized in that the electronic apparatus further comprises—a receiver (220*a*) configured for receiving one or more tactile user profiles; wherein a respective tactile user profile defines one or more tactile responses produced from the interactive area (201*a-c*) by the response unit (204), wherein the tactile user profile comprises associations between a respective function out of the
(Continued)

one or more functions provided by the interactive area (201*a-c*) and a corresponding tactile response.

17 Claims, 10 Drawing Sheets

(56) References Cited

U.S. PATENT DOCUMENTS

| | | | |
|---|---|---|---|
| 2002/0054060 A1 | 5/2002 | Schena | |
| 2009/0076912 A1* | 3/2009 | Rajan | G06Q 30/0267 |
| | | | 705/14.64 |
| 2015/0324049 A1* | 11/2015 | Kies | G06F 3/0416 |
| | | | 345/156 |
| 2016/0189492 A1 | 6/2016 | Hamam et al. | |
| 2018/0246574 A1 | 8/2018 | Modarres et al. | |
| 2019/0087003 A1* | 3/2019 | Medlen | G06F 3/041 |

OTHER PUBLICATIONS

Microsoft Learn: "About User Profiles (Windows)", Apr. 30, 2018, XP055980020 (3 pages).
Ericsson: "What is an User Profile?", 3GPP Draft; UP-010005, 3rd Generation Partnership Project (3GPP), Mobile Competence Centre, Jun. 26, 2001 (11 pages).
ETSI, "Personalization and User Profile Management; User Profile Preference and Information Setting Objects User Profile Preference and Information Settings; Draft ETSI ES 202 XXX" vol. HF, No. V0.0.2, Jun. 16, 2008 (49 pages).

* cited by examiner

100

Start 411 detect presence of second electronic device 412 transmit request for tactile user profile 413 receive tactile user profile 414 select a part of a respective tactile user profile 415 sense touch and/or proximity 416 produce haptic response 417 delete tactile user profile End

HAPTIC PROFILES FOR ELECTRONIC DEVICES

CROSS REFERENCE TO RELATED APPLICATIONS

This application is a 35 U.S.C. § 371 National Stage of International Patent Application No. PCT/EP2022/058010, filed 2022 Mar. 25.

TECHNICAL FIELD

The embodiments herein relate to a first electronic apparatus and a second electronic apparatus and methods for providing haptic feedback from the first electronic apparatus. A corresponding computer program and a computer program carrier are also disclosed.

BACKGROUND

Electronic devices, such as mobile devices, headsets, cameras, etc., may each comprise physical buttons, sliders, switches or turning knobs that are tied to specific functions or a specific functionality in the respective device. Such devices may also have buttons embedded in the surface, such as touch buttons, or other touch and/or press interfaces such as visual keys on a screen that will trigger a specific functionality. In this disclosure all these types of device controls will be referred to as "buttons".

A user of these electronic devices may learn the functionality of the buttons by reading the device manual and/or by looking at icons and/or text engraved or embossed or printed on said buttons.

If a physical button of the electronic device is not in direct line of sight, or in line of sight but occluded by a user's hand or fingers, e.g., by being located on a headset being worn by the user, and if there is more than one button closely located on said headset, the user may need to use his or her fingers to sense an area around the buttons to make sure the right button is being used. This may be cumbersome to the user and may result in the user interacting with a button which the user didn't intend to interact with. In the end the power consumption of the electronic apparatus may be increased.

Furthermore, if a device is not used often the user might forget about the functionality and placement of the physical buttons and may need to relearn the functionality.

Electronic devices may also comprise one or more physical buttons respectively tied to more than one specific function or functionality in the electronic apparatus.

This may create an ambiguity for the user regarding which function relates to a specific button at a specific time. This is especially true for mobile devices with very few buttons so that each button has multiple functions depending on which application is currently being used.

Some prior art physical buttons support audible and/or visual feedback cues being provided to the user. One example is volume up and volume down physical buttons on a mobile device that affect the volume in a music player application but could also affect the zoom level in the camera application depending on which application is currently being used. If the user is currently using the camera application, it is apparent (visually as the camera is currently the active application) to said user that the buttons correspond to zoom in and zoom out. If the user listens to music in the music player application, it is apparent (audibly and visually if the user looks at the application being displayed on the device) to said user that the buttons correspond to volume up and volume down.

As described above, physical buttons may require direct line of sight and/or visual and/or audible feedback cues for quick and confident device operation, such as user interface operation.

However, audible feedback cues are typically overlayed on existing content, e.g., if music is being listened to the cues may be overlayed on said music and thereby interrupt or disturb the content being listened to.

Visual feedback cues could be displayed on said buttons or on a related device display. However, visual feedback cues require line of sight. Further, as for the audible feedback cues, also the visual feedback cues may disturb the content of the display. Furthermore, the power consumption related to displaying visual cues may be considerable.

SUMMARY

In order to obviate some of the problems related to handling of physical buttons on electronic devices, or in other words electronic apparatuses, buttons that provide tactile feedback are provided. The tactile feedback may be in the form of moving patterns, e.g., a haptic pattern that induces a feeling that an arrow is moving on the button. Such tactile pattern or movement may be changed. For example, the tactile feedback may be initiated when a finger is on or close to the button or interactive area, but before the user has pressed the button and thereby activated the function. Such a solution enables to identify relevant functions by only touching the button, and the same button may have different functions with different tactile feedbacks.

However, the first user also needs to learn which tactile feedback corresponds to which function. As devices including buttons providing tactile feedback become more common, more and more devices will have such tactile feedback on buttons, and then a problem may arise if different manufacturers or different types of devices have different tactile feedback for the same or similar functions, especially for devices where the user cannot easily look at the button for an icon or similar.

Thus, an object of embodiments herein may be to obviate some of the problems related to handling of physical buttons on electronic devices or apparatuses, or at least reduce the impact of them.

According to a first aspect, the object is achieved by an electronic apparatus. The electronic apparatus comprises:
  an interactive area configured to provide one or more functions of the electronic apparatus;
  a sensing unit configured to sense a touch and/or a proximity of an object interacting with the interactive area;
  a response unit configured to produce a tactile response from the interactive area to sensing the touch and/or the proximity of the object;
  a processing unit comprising circuitry configured to urge the response unit to produce the tactile response. The tactile response corresponds to one of the one or more functions provided by the interactive area in response to an interaction with the interactive area after the tactile response is provided.

The electronic apparatus is characterized in that the electronic apparatus further comprises:
  a receiver configured for receiving one or more tactile user profiles.

The respective tactile user profile defines one or more tactile responses produced from the interactive area by the response unit, and wherein the tactile user profile comprises associations between a respective function out of the one or more functions provided by the interactive area and a corresponding tactile response.

According to a second aspect, the object is achieved by a method, performed by an electronic apparatus for providing haptic feedback in the electronic apparatus comprising an interactive area configured to provide one or more functions of the electronic apparatus. The method comprises:

The method comprises receiving one or more tactile user profiles. The respective tactile user profile defines one or more tactile responses produced from the interactive area. The tactile user profile comprises associations between a respective function out of the one or more functions provided by the interactive area and a corresponding tactile response.

The method further comprises sensing a touch and/or a proximity of an object interacting with the interactive area.

The method further comprises producing a tactile response to sensing the touch and/or the proximity of the object interacting with the interactive area.

The tactile response corresponds to one of the one or more functions provided by the interactive area in response to an interaction with the interactive area after the tactile response is provided. The tactile response is produced depending on the function provided by the interactive area and the one or more tactile user profiles.

According to a third aspect, the object is achieved by a second electronic apparatus configured to assist in providing haptic feedback from a first electronic apparatus. The second electronic apparatus comprises a processing unit comprising circuitry configured to receive information, from the first electronic apparatus, indicative of support for one or more tactile user profiles defining one or more tactile responses produced from an interactive area of the first electronic apparatus.

The tactile user profile comprises associations between a respective function out of one or more functions provided by the interactive area and a corresponding tactile response.

The circuitry configured is further configured to provide a tactile user profile to the first electronic apparatus.

The tactile user profile is selected out of one or more selectable tactile user profiles based on tactile user profile information and based on functional and/or haptic capabilities of the first electronic apparatus.

According to a fourth aspect, the object is achieved by method, performed by a second electronic apparatus, for assisting in providing haptic feedback from a first electronic apparatus.

The method comprises receiving information, from the first electronic apparatus, indicative of support for one or more tactile user profiles defining one or more tactile responses produced from an interactive area of the first electronic apparatus.

The tactile user profile comprises associations between a respective function out of one or more functions provided by the interactive area and a corresponding tactile response.

The method further comprises providing a tactile user profile to the first electronic apparatus. The tactile user profile is selected out of one or more selectable tactile user profiles based on tactile user profile information and based on functional and/or haptic capabilities of the first electronic apparatus.

According to a further aspect, the object is achieved by a computer program comprising instructions, which when executed by a processor, causes the processor to perform actions according to any of the aspects above.

According to a further aspect, the object is achieved by a carrier comprising the computer program of the aspect above. The carrier may be one of an electronic signal, an optical signal, an electromagnetic signal, a magnetic signal, an electric signal, a radio signal, a microwave signal, or a computer-readable storage medium.

Since the receiver of the electronic apparatus is configured for receiving the one or more tactile user profiles defining one or more tactile responses produced from the interactive area by the response unit and comprising associations between the respective function out of the one or more functions provided by the interactive area and the corresponding tactile response, the tactile response of the interactive area will be well known to the user, regardless of the type of electronic apparatus, as long as it is the same or similar function that is provided.

A further advantage of embodiments herein is that they are particularly useful when there is no line of sight to the interactive area and any visual indication of the functions provided by the interactive area. This may be the case for functions on a button the user cannot see or should not look at, such as on a headphone, XR headset, steering wheel of car, etc.

A further advantage of embodiments herein is that they allow different users to have different such tactile profiles on the same electronic apparatus, while each user has a common set of tactile patterns regardless of which electronic apparatus is being used. Embodiments herein enable personal tactile profiles for devices that are not entirely personal. For example they may be used by different people but one at a time, for example when sharing a head-mounted display (e.g., with Augmented Reality and/or Virtual Reality (AR/VR)), a pair of headphones, or a large screen with buttons on the back side of the screen.

BRIEF DESCRIPTION OF THE DRAWINGS

In the figures, features that appear in some embodiments are indicated by dashed lines.

The various aspects of embodiments disclosed herein, including particular features and advantages thereof, will be readily understood from the following detailed description and the accompanying drawings, in which.

DETAILED DESCRIPTION

Figure 1:
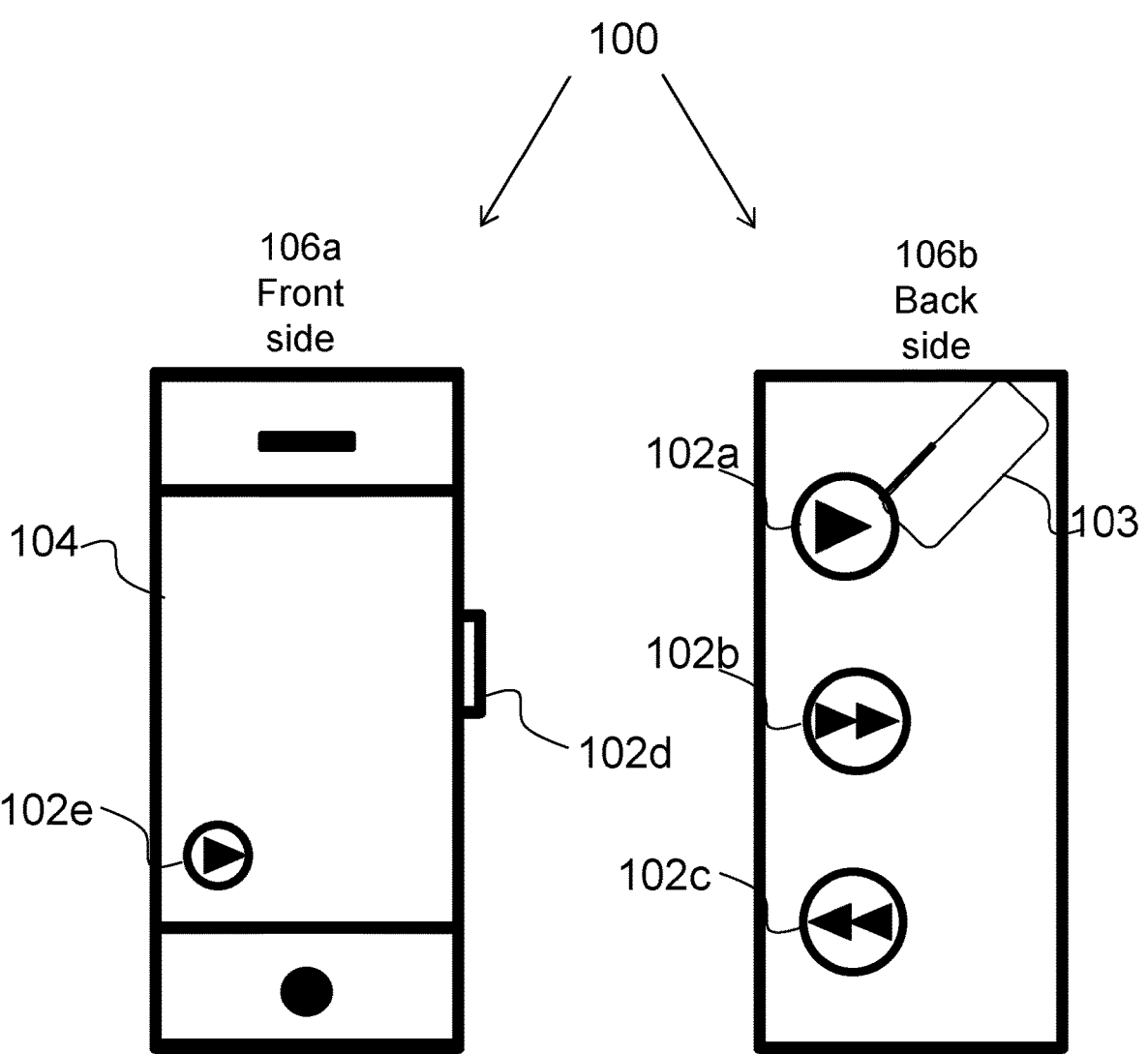
FIG. 1 illustrates an exemplary embodiment of an electronic apparatus.

According to embodiments herein a user may have a personal tactile button profile. The personal tactile button profile comprises a mapping where each function of a tactile button is mapped to a specific tactile pattern. In some embodiments, the pattern is also specified with temporal information, which can be e.g., how fast the pattern shall be generated (e.g., in Hz), and/or a duration of the tactile feedback (e.g., in seconds). This mapping, or tactile profile, may be stored in a personal apparatus of the user, e.g., in a smartphone or smartwatch, or reside in a user profile that may be accessed over internet or a mobile edge cloud.

It is assumed that the apparatuses having tactile buttons support a change of tactile pattern of the buttons, so that the tactile profile for each function (a button may have multiple functions depending on context or design) may be changed.

Tactile buttons may be essential for buttons the user cannot see or is not supposed to look at while operating them (e.g., buttons on a headphone, an XR headset, a steering wheel of car, etc.). For such buttons a familiar tactile pattern should be available regardless of device, otherwise it will be very difficult for the user to remember which button corresponds to which function.

Furthermore, embodiments herein make certain that an individual user will always have the same tactile patterns available, which may be beneficial if there is no common standard to match certain tactile feedback to certain button-functions. Furthermore, as different users may have different preferences (e.g., a specific user uses certain functions more often, is more sensitive to certain tactile patterns, or simply gets used to tactile patterns of a certain product first and then does not want to change), embodiments herein are described which allow different users to have different such tactile profiles, so that each user may have a common set of tactile patterns (corresponding to a tactile user profile) at his/her disposal regardless of which device is being used.

Embodiments herein are also described, where personal tactile profiles are available for devices that are not 100% personal, i.e., that may be used by different people but one at a time, for example when sharing a head-mounted display (AR/VR), a pair of headphones, or a large screen with buttons on the back side.

Embodiments herein disclose a framework for tactile user profiles, and related mechanisms for using those in multiple devices. The user may have a private profile where different functions, e.g., play, stop, step forward, increase volume, etc., are mapped to specific tactile patterns for interactive areas, such as buttons. The tactile patterns may for example be described as pulsating right, wave pattern, quick pulses, Morse patterns, circulating movements, static patterns etc.

In an example a first user pairs a first electronic apparatus capable of haptic feedback, e.g., a headset, with a second electronic apparatus. The second electronic apparatus may be associated with a user account or a user identity of the first user. The second device may be e.g., a smartphone or smartwatch or a tablet, or a computer.

The tactile user profile of the first user may be loaded into the headset and associated with the functions of its buttons, or with functions that may be mapped on its buttons if they are programmable or dynamic. Example embodiments of physical characteristics of the buttons will be described below, but also other embodiments are possible.

When the first user feels with his/her hand or fingers on the buttons of the first electronic apparatus capable of tactile feedback, such as haptic feedback, there will be tactile feedback corresponding to the different functions of the buttons according to the tactile user profile of the first user. If the first user activates another device, e.g., an XR headset, tactile feedback of the buttons of the device will be produced according to the first user's preferences as well-exactly as the user is used to and prefers to have.

If another second user borrows the same headset and pairs it with a personal device associated with him/herself, the tactile feedback of the buttons of the headset will now be provided according to the tactile user profile of the second user.

Embodiments herein disclose mechanisms and concepts for how to load the tactile user profiles in devices capable of tactile feedback, and also some concepts for how the tactile user profiles may be updated.

Further, embodiments herein relate to electronic apparatuses and interaction with their interactive areas in general. For example, embodiments herein may relate to electronic apparatuses and their physical buttons. Electronic apparatuses may also be referred to as electronic devices.

FIG. 1 depicts an electronic apparatus 100 wherein embodiments herein may be implemented. The electronic apparatus 100 may be or comprise any of a wireless communication device, a tablet, a TV, a monitor, a headset, electronic eyewear, an alarm clock, a car, or an audio player. The electronic apparatus 100 may be a wireless communication device, such as a mobile phone, for a cellular communications system.

Specifically, the electronic apparatus 100 may be a peripheral device, such as a headset, an augmented or virtual reality headset or electronic eyewear, such as smart glasses. Other examples of implementations of the electronic apparatus 100 are a watch, such as a smart watch. In FIG. 1 the electronic apparatus 100 is illustrated using the example of a mobile phone.

The electronic apparatus 100 comprises an interactive area 102*a-d*. The interactive area 102*a-d* is configured to provide one or more functions of the electronic apparatus 100. The interactive area 102*a-d* may comprise a touch input arrangement such as one or more physical buttons and/or a touch panel.

In some embodiments, such as in a mobile device, the electronic apparatus 100 further comprises a display 104, e.g., arranged on a first surface 106*a* of the electronic apparatus 100, such as a front side of the electronic apparatus 100 in FIG. 1. The display 104 may comprise a touch panel not shown in FIG. 1. The display may also be referred to as the screen. The display may take up a large part, or even all, of the first surface 106*a*.

In some embodiments the interactive area 102*a-d* may be more or less visually obstructed, e.g., arranged on a surface of the electronic apparatus 100 which usually is not visible when operating the electronic apparatus 100. For example, the interactive area 102*a-d* may be arranged on the electronic apparatus 100 such that it is not visible when the display 104 is viewed. As an example, in FIG. 1 a first interactive area 102*a*, a second interactive area 102*b* and a third interactive area 102*c* are arranged on a second surface 106*b*, such as on a backside of the electronic apparatus 100. The second surface 106*b* is thus different from the first surface 106*a*. The second surface 106*b* may face away from the first surface 106*a*. The second surface 106*b* may face an opposite direction compared to the first surface 106*a*.

In other embodiments a fourth interactive area 102*d* is arranged on the electronic apparatus 100 such that only a part of the fourth interactive area 102*d* is visible, e.g., when viewing the front side 106*a*. The fourth interactive area 102*d* may, e.g., be arranged on a side surface of the electronic apparatus 100.

FIG. 1 further illustrates an object 103 interacting with the electronic apparatus 100, more specifically with the first interactive area 102a. The object 103 may be a part of a user, such as a finger, or part of a finger.

Figure 2:
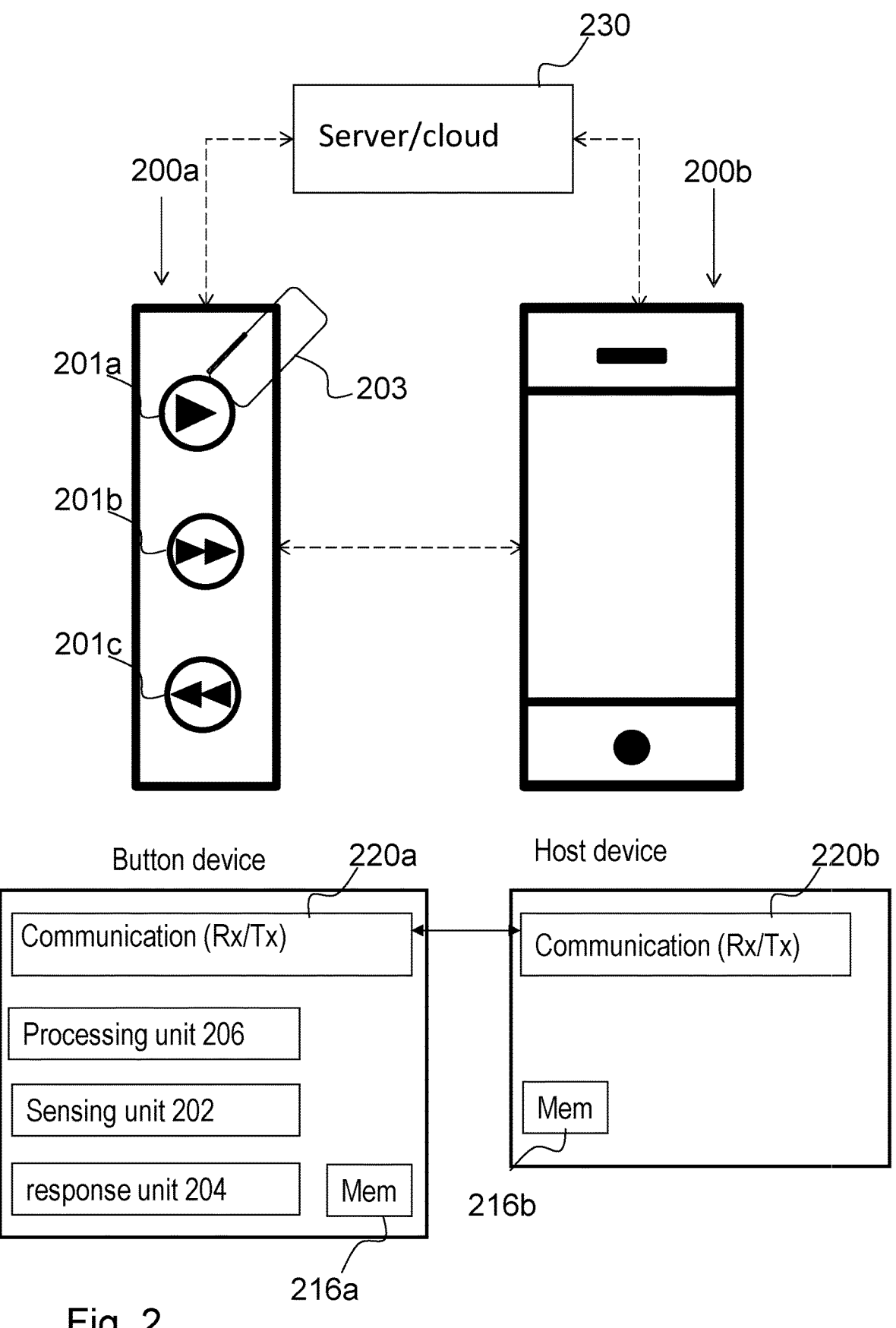
FIG. 2 illustrates exemplary embodiments of a first electronic apparatus and a second electronic apparatus.

FIG. 2 depicts a first electronic apparatus 200a, such as a button device and a second electronic apparatus 200b, such as a host device, wherein embodiments herein may also be implemented. The second electronic apparatus 200b may be a mobile phone and the first electronic apparatus 200a may be an associated peripheral device, such as a headset or electronic eyewear.

In some embodiments the first electronic apparatus 200a may comprises one or more interactive areas 201a-c comprising a first interactive area 201a, a second interactive area 201b and a third interactive area 201c, which correspond to the interactive areas 102a-c of the electronic apparatus 100. As mentioned above, the interactive areas 201a-c may be implemented as one or more physical buttons and/or as a touch panel. In other words, the interactive areas 102 a-c,201a-c may comprise a touch-sensitive area.

FIG. 2 further illustrates an object 203 interacting with the first electronic apparatus 200a, more specifically with the first interactive area 201a. The object 203 may be a part of a user, such as a finger, or part of a finger.

As also mentioned above, if the interactive area 102a-d of the electronic apparatus 100 or the interactive area 201a-c of the first electronic apparatus 200a is not in direct line of sight, e.g., by being located on a headset being worn by a user, and if there is more than one interactive area 102a-d, 201a-c located closely to each other, the user may need to use his or her fingers to sense an area around the interactive areas 102a-d, 201a-c to make sure the right interactive area 102a-d, 201a-c is being used. This may be cumbersome to the user and may result in the user interacting with an interactive area 102a-d, 201a-c which the user didn't intend to interact with. Further, embodiments herein may also be directed to interactive areas which are normally in line of sight since blind people are not capable of seeing buttons. In the end the power consumption of the electronic apparatus may be increased. Embodiments herein seek to reduce at least some of the problems described above.

FIG. 2 further illustrates a system block diagram of the first electronic apparatus 200a and the second electronic apparatus 200b.

The electronic apparatus 200a further comprises a sensing unit 202 configured to sense a touch and/or a proximity of the object 203 interacting with the interactive area 201a-c.

For example, the interactive area 201a-d may comprise one or more buttons, the respective button being sensitive to touch and/or proximity for sensing the touch and/or the proximity of the object 203 and/or pressure for activating the function provided by the interactive area 201a-c. Such a button will be presented in greater detail below when describing FIG. 3.

The first electronic apparatus 200a further comprises a response unit 204 configured to produce a tactile response, such as a haptic response from the interactive area 201a-c to sensing the touch and/or the proximity of the object 203. In embodiments herein tactile and haptic is used interchangeably. Thus, in embodiments herein the tactile response may comprise also kinesthetic responses as well i.e., responses that trigger biosensors in for example a person's muscles, joints, or tendons.

The first electronic apparatus 200a further comprises a processing unit 206 comprising circuitry configured to urge the response unit 204 to produce the haptic response. The haptic response corresponds to one of the one or more functions provided by the interactive area 201a-c, e.g., in response to an interaction with the interactive area 201a-c.

The interaction may be sensed after the haptic response is provided. Then the interaction with the interactive area 201a-c may be a second interaction with the interactive area 201a-c. For example, the sensed touch and/or proximity of the object 203 may be a first interaction with the interactive area 201a-c.

The first electronic apparatus 200a further comprises some first communications means 220a. The first communications means 220a comprises a receiver configured for receiving one or more tactile user profiles. A respective tactile user profile defines one or more haptic responses produced from the interactive area 201a-c by the response unit 204. The tactile user profile comprises associations between a respective function out of the one or more functions provided by the interactive area 201a-c and a corresponding haptic response.

In some embodiments the tactile user profile comprises associations between the respective function provided by the interactive area 201a-c and the corresponding haptic response combined with a further sensory response.

In some embodiments the tactile user profile is a default tactile user profile associated with the electronic apparatus 200a. The default tactile user profile associated with the electronic apparatus 200a may be a tactile user profile defined by the manufacturer of the first electronic apparatus 200a. In such cases the default user profile may be stored in the first electronic apparatus 200a.

In some embodiments the tactile user profile is a default tactile user profile associated with a user of the electronic apparatus 200a. In such cases the default user profile may be received from the second electronic apparatus 200b and/or a server or a cloud 230.

In some embodiments the one or more tactile user profiles are stored in a location outside of the electronic apparatus 100, 200a, such as in the second electronic apparatus 200b or the cloud 230. Then the one or more tactile user profiles are downloadable to the electronic apparatus 100, 200a from the location outside of the electronic apparatus 100, 200a.

The tactile user profile may be one of a number of predefined tactile user profiles. For example, the cloud 230 may store predefined tactile user profiles for multiple users.

The first electronic apparatus 200a may further comprise a first memory 216a for storing the one or more tactile user profiles.

The second electronic apparatus 200b may comprise a second memory 216b for storing the one or more tactile user profiles.

The memories 216a, 216b may be writeable so that an application in the electronic apparatuses 200a, 200b may write appropriate data in the respective memory 216a, 216b.

The second electronic apparatus 200b may further comprise a second communications means 220b. The communication between the first electronic apparatus 200a and the second electronic apparatus 200b may be radio based and could use various different communication protocols such as Bluetooth, Zigbee, Z-wave, Wi-Fi, and cellular to mention a few. The devices may be paired, and the first electronic apparatus 200a may have the functionality to wake up the second electronic apparatus 200b.

Figure 3:
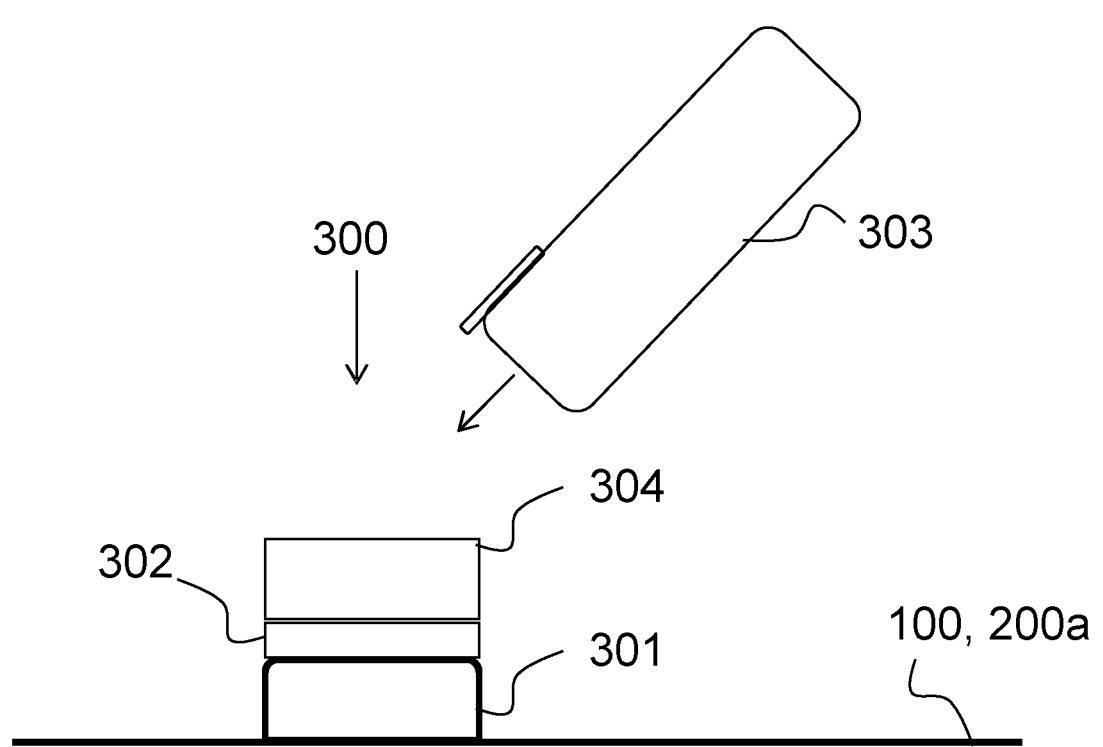
FIG. 3 illustrates an exemplary embodiment of a button.

FIG. 3 depicts details of an exemplifying embodiment of an interactive area in the form of a button 300 of the electronic apparatus 100 or of the first electronic apparatus 200a according to embodiments herein. In the following, the button 300 will be described with reference to the electronic apparatus 100 only although embodiments of the button 300 are equally applicable to the first electronic apparatus 200*a* of FIG. 2. The button 300 may be arranged on the electronic apparatus 100.

The button 300 may comprise a mechanical switch actuator 301 for triggering a function related to the button.

The button 300 may further comprise a sensing unit, e.g., an electromagnetic sensor 302, for sensing the touch and/or the proximity of an object 303 interacting with the button 300.

The electromagnetic sensor 302 may comprise the interactive area 201*a-c* of the touch-sensitive area.

The button 300 may also comprise a responsive material structure 304 for providing haptic feedback to the object 303 interacting with the button 300. The response unit 202 mentioned in relation to FIG. 2 above may correspond to or comprise the responsive material structure 304. The haptic feedback may be associated with the function which is triggered by the mechanical switch actuator 301. The object 303 may be a part of a user, such as a finger, or part of a finger.

The mechanical switch actuator 301 may comprise a collapsible mechanical structure. For example, the mechanical switch actuator 301 may comprise a dome switch actuator. Such mechanical switches provide both tactile feedback and function activation in a single button. For example, the mechanical switch actuator 301 may provide push haptic sensation and function activation. The activation of the function is triggered by a collapse of the mechanical switch actuator 301 due to a physical press, e.g., by the user.

The electromagnetic sensor 302 may be a capacitive sensor.

The electromagnetic sensor 302 allows to sense when the object 303 is touching or is located near the physical button 300. The electromagnetic sensor 302 may be activated with zero-force touch. That is, the electromagnetic sensor 302 may detect zero-force-touch. A zero-force touch sensor is able to register a touch with essentially no or very low pressure and convert that touch into an electrical output that initiates an operation or a function. As will be described in more detail below in relation to FIG. 4*a*, in embodiments herein, initiating the operation or the function may comprise controlling, by e.g., activating or triggering, a state of the button 300 which is related to a function that can be performed by the electronic apparatus 100 by activating the mechanical switch actuator 301 and which may be indicated to the user with the haptic feedback. For example, a tap of the button 300, may change the function of the button 300 and thereby change the related haptics. This will be further described below when describing action 402.

In some embodiments disclosed herein, the electromagnetic sensor 302 may be arranged between the mechanical switch actuator 301 and the responsive material structure 304.

In some further embodiments disclosed herein, the button 300 may comprise a layered structure and the electromagnetic sensor 302 may be located in a second layer arranged between a first layer comprising the mechanical switch actuator 301 and a third layer comprising the responsive material structure 304.

In some further embodiments disclosed herein, the electromagnetic sensor 302 may be at least partly covered by a conductive material. For example, a capacitive sensing region of the capacitive sensor may not be covered fully by a conductive material. Thus, in some embodiments disclosed herein, the electromagnetic sensor 302 may be at least partly not covered by a conductive material on a sensing side of the electromagnetic sensor 302.

The responsive material structure 304 for providing haptic feedback may be one of an electroactive material structure, a photomechanical material structure and a heat activated material structure. The electroactive material structure may comprise an electroactive polymer (EAP). A typical characteristic property of an EAP is that they will undergo a large amount of deformation while sustaining large forces.

Thus, the one or more buttons 300 may comprise a layer of an EAP which produces the haptic response from the interactive area 201*a-c*, 300.

The responsive material may also be called smart material, and/or intelligent material. Such materials may be designed materials that have one or more properties that can be significantly changed in a controlled fashion by external stimuli, such as stress, moisture, electric or magnetic fields, light, temperature, pH, or chemical compounds.

In some embodiments disclosed herein, light may be used to activate a photomechanical material. For example, a Light-Emitting Diode (LED) may be integrated in the mechanical switch actuator 301. When light from the LED is activated, it will also activate the photomechanical material. The LED may be activated based on the sensed touch and/or proximity of the object with the electromagnetic sensor 302. For example, there may be a power management unit (PMU) or a light management unit (LMU) that controls the LED. The LED may be electrically connected to the PMU or the LMU and ground. In another embodiment the LED may be electrically connected to the PMU or the LMU and a common electrical connection for multiple LEDs back to the PMU/LMU.

In some other embodiments disclosed herein, the electromagnetic sensor 302 comprises a photo sensor close to the LED which is arranged and configured to detect light changes. When the object 303, such as a finger, approaches the button 300 the light will reflect on the object 303 and the photodiode will detect changes in the detected light due to changes in the reflection from the object 303 and proximity may be sensed in that way.

In embodiments disclosed herein, the responsive material structure 304 may be triggered to change a property, such as its size and/or shape, by an output from the electromagnetic sensor 302. The change of the property may be dependent on an associated function to be activated by the mechanical switch actuator 301. The associated function may in some embodiments herein be determined by the output from the electromagnetic sensor 302.

Smart materials may be the basis of many applications, including sensors and actuators, or artificial muscles, particularly as electroactive polymers.

Terms used to describe smart materials include shape memory material (SMM) and shape memory technology (SMT).

In embodiments disclosed herein, the responsive material structure 304 may generate physical haptic patterns which can be identified and differentiated by a user.

The haptic feedback may comprise a mechanical deformation of the responsive material structure 304. For example, the mechanical deformation may be triggered by an output from the electromagnetic sensor 302 and may be dependent on an associated function to be triggered by the mechanical switch actuator 301. The associated function may in some embodiments herein be determined by the output from the electromagnetic sensor 302.

In some embodiments disclosed herein, the responsive material structure 304 may be arranged or configured such that it is responsive to sensing the touch and/or proximity of the object 303 in relation to the button 300. For example, the responsive material structure 304 may be electrically connected to the electromagnetic sensor 302.

Figure 4A:
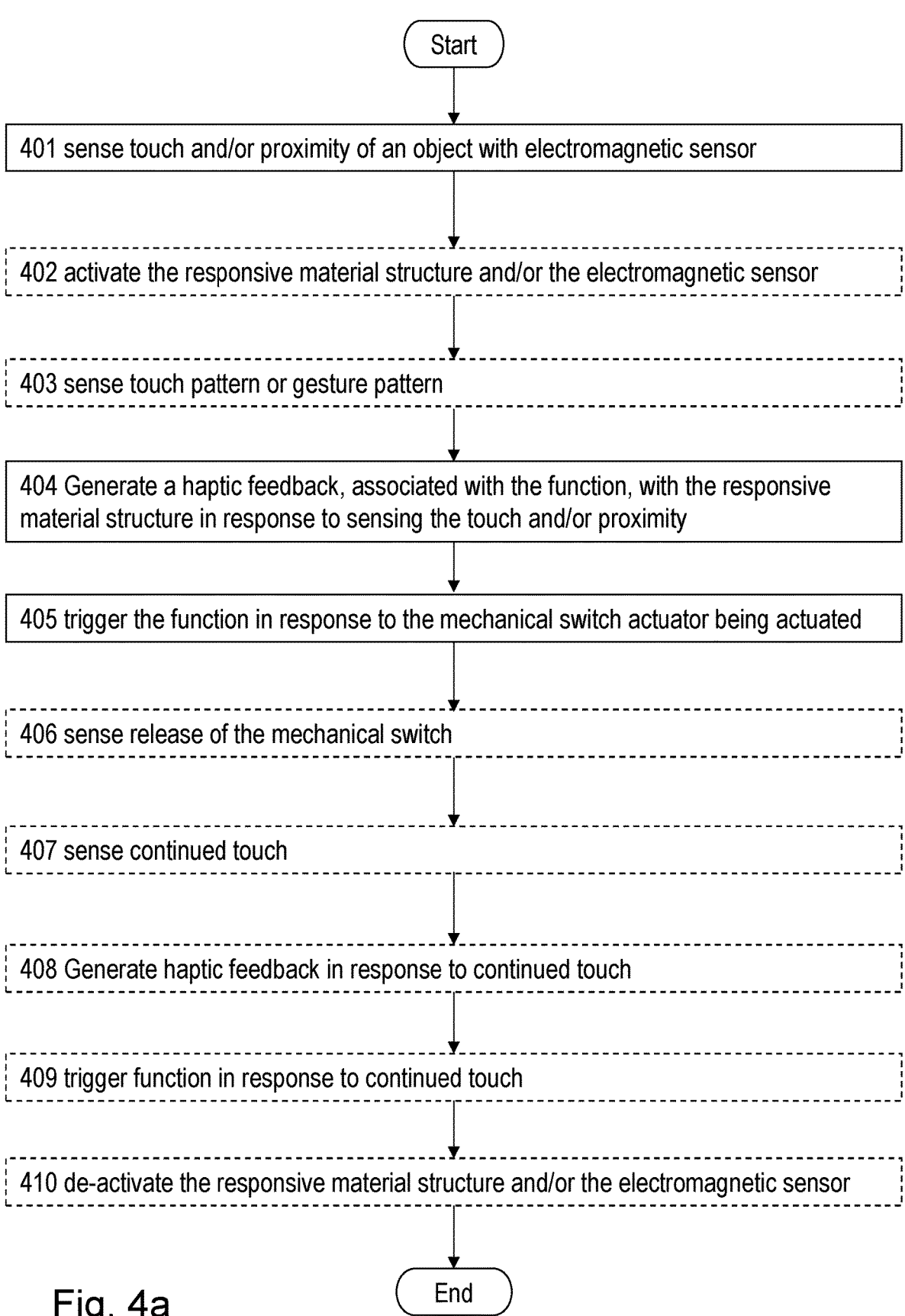
FIG. 4a is a flowchart illustrating an embodiment of a method performed by an electronic apparatus.

Exemplifying embodiments herein will now be described with reference to FIG. 4*a* and with further reference to FIGS. 1, 2 and 3. FIG. 4*a* illustrates a flowchart describing a method, performed by an electronic apparatus 100, 200*a*, for actuation of the function of the electronic apparatus 100, 200*a*.

As will be detailed below, the button 300 may revolve through many states as it may have more than one activation stage. The multi-activation combined with the haptic material enables mapping more functions on a few physical buttons at one specific context or mode of the electronic apparatus 100, 200*a*, while providing function specific haptic cue to the user before pressing the button 300 in order to eliminate uncertainty on which function would be triggered by pressing the button.

One or more of the following actions presented in FIG. 4*a* may be performed in the following exemplifying order. In other examples, the order may differ from what is described below.
Action 401
The electronic apparatus 100, 200*a* senses the touch and/or the proximity of the object 303 with the electromagnetic sensor 302. For example, the electronic apparatus 100, 200*a* may sense a touch and/or a proximity of a finger of a user of the electronic apparatus 100, 200*a*.
Action 402
In some embodiments herein the electronic apparatus 100, 200*a* activates the responsive material structure 304 and/or the electromagnetic sensor 302 in response to sensing the touch and/or the proximity of the object 303 with the electromagnetic sensor 302. Activating the responsive material structure 304 may comprise activating a high-power mode of the responsive material structure 304. In some embodiments herein the responsive material structure 304 is configured to generate the haptic feedback in the high-power mode while it is configured to not generate the haptic feedback in a low-power mode, i.e., before the activation.

Activating the electromagnetic sensor 302 may comprise activating the electromagnetic sensor 302 to detect zero-force touch in response to sensing proximity of the object 303.

Activating the electromagnetic sensor 302 may further comprise activating a state of the button 303. The state may be activated by selection, e.g., by changing state from a current state. The state of the button may be associated with a function that can be triggered by interaction with the button 300. For example, activating the state may comprise selecting or changing a function associated with the button 303. Thus, the electromagnetic sensor 302 may control the function of the button 300 based on the interaction with it. The function may then be triggered by the mechanical switch actuator 301. For example, performing the function may be triggered by the mechanical switch actuator 301.

Activating the state of the button 300, e.g., with a tap of the button 300, may change the function of the button 300 and thereby change the related haptics. The haptics may be dependent on the activation of the electromagnetic sensor 302. For example, the haptic feedback may be dependent on how the electromagnetic sensor 302 is activated and the history of the sensed touch. This will be described in more detail below after the description of FIG. 4*a* using some exemplary embodiments. In short, in some embodiments multiple functions of the electronic apparatus 100, 200*a* may be handled by the button 300 by iterating through the various functions by sensing touch with the electromagnetic sensor

302 and rendering related cues as haptic patterns with the responsive material structure 304.

In some embodiments some haptic feedback may be associated with functions triggered by the electromagnetic sensor 302, while other haptic feedback may be associated with functions triggered by the mechanical switch actuator 301.

Activating the electromagnetic sensor 302 may further comprise activating a more sensitive detection of the touch and/or the proximity and/or movement, such as gestures. For example, activating the electromagnetic sensor 302 may comprise changing sensor settings such as frequency of scans, signal strength and signal threshold.

In some embodiments herein the activation is conditioned. For example, the electronic apparatus 100, 200*a* may activate the responsive material structure 304 and/or the electromagnetic sensor 302 in response to sensing the touch and/or the proximity of the object 303 with the electromagnetic sensor 302 if the button 300 is configured to initiate the performing of the function in the context in which the electronic apparatus 100, 200*a* is used. In other words, the electronic apparatus 100, 200*a* may activate the responsive material structure 304 and/or the electromagnetic sensor 302 in response to sensing the touch and/or the proximity of the object 303 if the button 300 is configured to activate a function in the current context. For example, if the electronic apparatus 100, 200*a* is a mobile phone the button 300 may be configured to activate a certain function, such as a camera function, when the mobile phone is in a camera mode, while the same button may have no function tied to it when the phone is in a mode different from the camera mode. In this way power may be saved since the button 300 consumes less power than if it was active all the time.

An advantage of activating the responsive material structure 304 and/or the electromagnetic sensor 302 in response to sensing the touch and/or the proximity of the object 303 is that the power consumption of the electronic apparatus 100, 200*a* is reduced compared to if the responsive material structure 304 and/or the electromagnetic sensor 302 were active all the time.
Action 403
The electronic apparatus 100, 200*a* may then sense patterns of touch and/or proximity. For example, the electronic apparatus 100, 200*a* may activate the electromagnetic sensor 302 such that it is configured to sense patterns of touch and/or proximity. As described above in action 402 the activation may be in response to sensing the touch and/or the proximity of the object 303.

In some embodiments herein these patterns are used to explore multiple functions associated with the button 300. For example, the electronic apparatus 100, 200*a* may toggle through the multiple functions in response to sensing different patterns and then generate specific haptic feedback based on the sensed pattern.

The generation of the haptic feedback is described in more detail below in action 404. The electronic apparatus 100, 200*a* may then select a function to perform out of the multiple functions associated with the button 300 based on the pattern that was sensed before the mechanical switch actuator 301 was actuated. Actuation of the mechanical switch actuator 301 is described in more detail below in action 405.

In some embodiments disclosed herein, the electromagnetic sensor 302 may trigger different functions of the mechanical switch actuator 301 based on a sensed touch pattern. For example, the electromagnetic sensor 302 may, based on the sensed touch pattern, simulate different buttons associated with a music player (play, skip, FF, RW, pause etc) and select the associated function. A zero-force touch may be sensed to change function, and a force press may actuate the mechanical switch actuator 301 to activate the same function.

Action 404

The electronic apparatus 100, 200a generates haptic feedback with the responsive material structure 304 in response to sensing the touch and/or the proximity of the object 303. The haptic feedback is associated with a function to be performed by the electronic apparatus 100, 200a, which function is activated by the mechanical switch actuator 301. As mentioned above, in some embodiments some haptic feedback may be associated with functions triggered or activated by the electromagnetic sensor 302, while other haptic feedback may be associated with functions triggered or activated by the mechanical switch actuator 301.

Since the haptic feedback is generated in response to sensing the touch and/or the proximity of the object 303 the haptic feedback may be generated before the function is activated in order to inform the user of which function is going to be activated by the activation of the mechanical switch actuator 301. This allows for more functions to be activated by one button.

A further advantage of embodiments herein is that they don't require line of sight for providing feedback cues.

A yet further advantage of embodiments herein is that the haptic feedback doesn't disturb content being consumed by the user.

In some embodiments disclosed herein, generating the haptic feedback may be based on sensing a touch pattern or a movement pattern of the object 303 with the electromagnetic sensor 302. The movement pattern may comprise a gesture pattern.

For example, generating the haptic feedback may be based on sensing a length of the touch pattern or the movement pattern, or a reference touch pattern or movement pattern, or a count of reference touch patterns or movement patterns. The movement pattern may be a movement pattern in proximity of the button 300. For example, moving towards the respective button 300 or moving from one button 201a towards another button 201b.

Generating the haptic feedback may further be based on a context in which the electronic apparatus 100, 200a is used. The context may comprise a software application running on the electronic apparatus 100, 200a and/or a mode of the electronic apparatus 100, 200a.

In some embodiments disclosed herein, when the function comprises adjusting an input parameter of the electronic apparatus 100, 200a the haptic feedback may be dependent on a value of the input parameter. For example, when adjusting a volume, a continuous press of the mechanical switch actuator 301 may successively adjust a volume level and the haptic feedback is changed accordingly-so the haptic feedback may depend on the actual value or level of the volume being changed. The haptic feedback may be implemented as pulses in the responsive material structure 304 where the frequency of the pulses depends on the current volume.

The haptic feedback may be further based on temperature and/or whether conditions.

Action 405

In some embodiments disclosed herein, the electronic apparatus 100, 200a may perform the function in response to the mechanical switch actuator 301 being actuated. In some embodiments herein the mechanical switch actuator

301 may be actuated after the responsive material structure 304 has generated the haptic feedback.

Action 406

In order to sense further inputs and activate further functions with the same button 300 the electronic apparatus 100, 200a may sense a release of the mechanical switch actuator 301.

Action 407

According to some embodiments herein the electronic apparatus 100, 200a may sense a continued touch of the object with the electromagnetic sensor 302 also after the electronic apparatus 100, 200a has sensed the release of the mechanical switch actuator 301.

For example, in some embodiments herein wherein the electronic apparatus 100, 200a performs a first function in response to the mechanical switch actuator 301 being actuated and the method further comprises sensing the release of the mechanical switch actuator 301 described above in action 406, then the electronic apparatus 100, 200a senses the continued touch of the object 303 with the electromagnetic sensor 302 in order to perform further functions with the same button 300. For example, the first function may be performed again in response to the sensing of the continued touch. For such embodiments the electronic apparatus 100, 200a may generate the haptic feedback corresponding to the first function again in response to the continued touch.

Action 408

When the first function is performed again in response to sensing the continued touch the electronic apparatus 100, 200a may generate the haptic feedback corresponding to the first function again in response to the continued touch.

Action 409

As mentioned above, the electronic apparatus 100, 200a may perform further functions with the same button 300 also after the release of the button 300.

In some embodiments the electronic apparatus 100, 200a may trigger the first function again in response to sensing the continued touch.

Action 410

It may be possible to turn off the electroactive material structure 304 when not used, e.g., after some duration, in order to save power.

Therefore, in some embodiments disclosed herein, the electronic apparatus 100, 200a may de-activate the responsive material structure 304 and/or the electromagnetic sensor 302 in response to not sensing the touch and/or the proximity of the object 303 with the electromagnetic sensor 302 during a time period.

Further Detailed Examples of the Button 300

In some embodiments, the button 300, such as a low-power smart-material physical button, may render a cue related to the function of the button 300 as a haptic pattern on the smart-material layer when the user finger is nearby or touching said button 300.

Example

1. The user places its finger on button 300 or in proximity of the button 300.
2. the electromagnetic sensor 302 senses the finger and generates a haptic cue with the responsive material structure 304 for a function being represented by said button 300.
3. If the user pushes the button 300 the function related to the button 300 will be initiated by the mechanical switch actuator 301. That is the actuation of the mechanical switch actuator 301 initiates the function.

4. The user removes its finger and the responsive material structure 304 stops generating the haptic cue. That is, the electronic apparatus 100, 200a senses a removal of the object 303, such as the finger, and stops generating the haptic cue.

The button may only generate haptic cues on the responsive material structure 304 once a finger is nearby or touching said button 300 which reduces power consumption. Thus, the power consumption is controlled by sensing the touch and/or the proximity.

Furthermore, in some embodiments herein, the responsive material structure 304 and any associated driving circuit is in the low-power mode until the finger is touching or near the button as indicated by the electromagnetic sensor 302, such as the capacitive sensor.

In some alternative embodiments the button 300 may be configured to handle multiple functions of the electronic apparatus 100, 200a by iterating through the various functions and rendering related cues as haptic patterns with the responsive material structure 304. Once a requested function is recognized by the user the user follows through with a physical push on the button 300 so as to select the function. Example:

1. The user places its finger 303 on the button 300 or in proximity of the button 300.
2. The electromagnetic sensor 302 senses the finger and generates a first haptic cue with the responsive material structure 304 for a first function being represented by said button 300.
3. Further different cues may be generated based on the below examples:
    a. If the electronic apparatus 100, 200a senses a continued touch on the button 300 while not sensing an actuation of the mechanical switch actuator 301 (e.g., if the user keeps its finger on the button 300 without pressing said button 300) the responsive material structure 304 will after some time generate a new second haptic cue for a second function being represented by said button 300. This may be repeated for all functions handled by said button 300. If no function is selected by the user, i.e., activated by the actuation of the mechanical switch actuator 301, then the first haptic cue will be generated again according to the above. The time period between the first haptic cue and the second haptic cue may be defined in seconds and may be preset or set by a user setting.
    b. If the electronic apparatus 100, 200a senses a tap (e.g., with a finger) on the button 300 without physically pressing said button it will generate the new second haptic cue for the second function being represented by said button. If no function is selected by the user, i.e., activated by the actuation of the mechanical switch actuator 301, then the first haptic cue will be generated again according to the above.
    c. Instead of sensing a tapping finger as in example b above, the electronic apparatus 100, 200a senses a removal of the finger and then a touch of the finger on or near the button within a predefined short time period in order for the next function to be presented by its related haptic cue.
4. If the user pushes the button 300 the function related to the current haptic cue will be initiated. That is the actuation of the mechanical switch actuator 301 initiates the function related to the current haptic cue.
5. The user removes its finger and the responsive material structure 304 stops generating the haptic cue.

In some further alternative embodiments, the electronic apparatus 100, 200a may initiate the same function as an initial function associated with a first actuation of the mechanical switch actuator 301 if one or more further actuations of the mechanical switch actuator 301 are performed within a limited period of time from the first actuation. The limited time period between two actuations may be defined in seconds and may be preset or set by a user setting. One use case where this would make sense is e.g., volume functionality where more than one button actuation sometimes is required to get to the desired volume level. Example:

1. The user places its finger on the button 300 or in proximity of the button 300.
2. The electronic apparatus 100, 200a senses the finger and generates a first haptic cue for a first function being represented by the button 300.
3. Further different cues may be generated based on the examples described above.
4. If the user pushes the button 300 the function related to the current haptic cue will be initiated. That is, the actuation of the mechanical switch actuator 301 initiates the function related to the current haptic cue.
5. The user removes its finger and the responsive material structure 304 stops generating the haptic cue.
6. If the user pushes the button 300 again after some time such that the mechanical switch actuator 301 is actuated again, the same function as initiated in step 4 above will again be initiated. If the user hasn't pushed again after some time, i.e., if the mechanical switch actuator 301 hasn't been actuated after some time, a subsequent actuation of the mechanical switch actuator 301 will fall into sequence again at step 1.

In some alternative embodiments the button 300 may initiate the same function as the initial function from the first push of the button 300 if the electronic apparatus 100, 200a senses a continued touch of the button 300 after the mechanical switch actuator 301 has been actuated and released.

In yet some alternative embodiments the electronic apparatus 100, 200a may cancel and/or undo and/or reverse the function related to the current haptic cue being generated if the user performs a long press on the button 300, i.e., if the electronic apparatus 100, 200a senses a long actuation of the mechanical switch actuator 301.

In yet some further alternative embodiments the haptic pattern may be dependent on temperature or weather data. For example, the electronic apparatus 100, 200a may use temperature sensor(s) and/or weather information from e.g., the electronic apparatus 100, 200a, a network, and/or Internet to understand if a haptic pattern better suited to the current temperature or weather conditions are to be generated. One example is cold weather where a clearer and/or stronger haptic cue pattern may be useful as fingers may have difficulties sensing the haptic cues.

In yet some other embodiments, the electronic apparatus 100, 200a may comprise a specific mode-button 300 with a distinct haptic cue, that changes the function of the other buttons and hence their corresponding haptic cue. In one example use case, the other buttons have functions related to an active application running on the electronic apparatus 100, 200a. Those functions may be rendered by corresponding haptic cues on the other buttons, and the specific mode-button changes the function of the other buttons to instead have functions related to the electronic apparatus 100, 200a or the navigation between applications. Since the function of each button has its own distinct haptic function, it is easy for the user to distinguish whether the buttons and their associated functions are associated to the application or the electronic apparatus 100, 200a without having to look at the buttons. This may be useful for example with buttons placed on a headset.

In yet some other embodiments, to further save power consumption while enabling a more intuitive user interface, only buttons having an active function in the current mode of the electronic apparatus 100, 200a may be enabled to render a haptic cue when a finger touches or comes close to the button 300, otherwise the buttons remain in deep sleep. This means that more buttons can be added for a potentially richer or more intuitive interface in e.g., a headset, without an increased ambiguity of which function is mapped to which button. Further, power consumption is not wasted on buttons not having an active function. If the user feels that there is a button but there is no haptic cue, that user will understand that the button is inactive and has no function when pressed. That is, the electronic apparatus 100, 200a may indicate that it is inactive by not generating any haptic cue.

In yet another embodiment, for buttons where a duration of a press has a meaning, this can be adaptively indicated by the haptic cue. That is, generating the haptic feedback may be dependent on a duration of the actuation of the mechanical switch actuator 301. As described above in relation to action 404, for such embodiments generating the haptic feedback may be dependent on the value of the input parameter of the electronic apparatus 100, 200a which is adjusted by the function that is activated by actuation of the mechanical switch actuator 301. That is, there may be a relation between the duration of the press and the value of the input parameter being adjusted, such as the volume of a headset.

For example, for a volume-up button 300, the haptic cue may be an upwards-directed wave. As the button 300 is held down to continuously actuate the mechanical switch actuator 301 and to increase the volume higher and higher, the frequency of the haptic cue increases. The frequency may increase from e.g., 1 Hz to several Hz. One use case is to increase or reduce the volume of a headset also when there is no playback audio. Then the electronic apparatus 100, 200a indicates, e.g., to a user, how much higher or lower the volume has been set by generating the haptic feedback.

The same button 300 may also have an alternative function, e.g., to what extent the headphone should be transparent to outside sound. That function may then have an alternative haptic cue associated to the alternative function. The frequency of the alternative haptic cue may also increase or decrease as the input parameter of the electronic apparatus 100, 200a is adjusted, e.g., by actuation of the mechanical switch actuator 301. In other words, the frequency of the alternative haptic cue may also increase or decrease as the user changes it gradually up or down.

The mapping of different functions onto the same button 300 in this example may be performed by letting the button 300 revolve through many states as presented above, and/or by the mode button, and/or by other methods.

According to yet another embodiment all of the above-mentioned embodiments may apply to any non-physical control, or in other words any non-physical interactive area 102e, such as a screen-based control or integrated touch button. A haptic material on the surface of such controllers may appear dynamically depending on the function initiated. For a screen-based haptic signature one example may be that it is possible to feel buttons of a music application, such as play and/or pause buttons, even if the screen 104 is black or the screen 104 is out of sight. Another example of the integrated touch button is volume or seat adjustment controllers integrated in the surface of a steering wheel of a car.

According to some embodiments above a low-power layered physical button 300 has been disclosed. One layer handles the touch and/or the proximity sensing which triggers feedback cue generation via haptic patterns on the responsive material layer once an object, such as a finger, is touching or nearby the physical button 300.

Further, some embodiments above disclose multistage activation of the physical button 300 by sensing proximity and/or zero force touch and physical press.

Figure 4B:
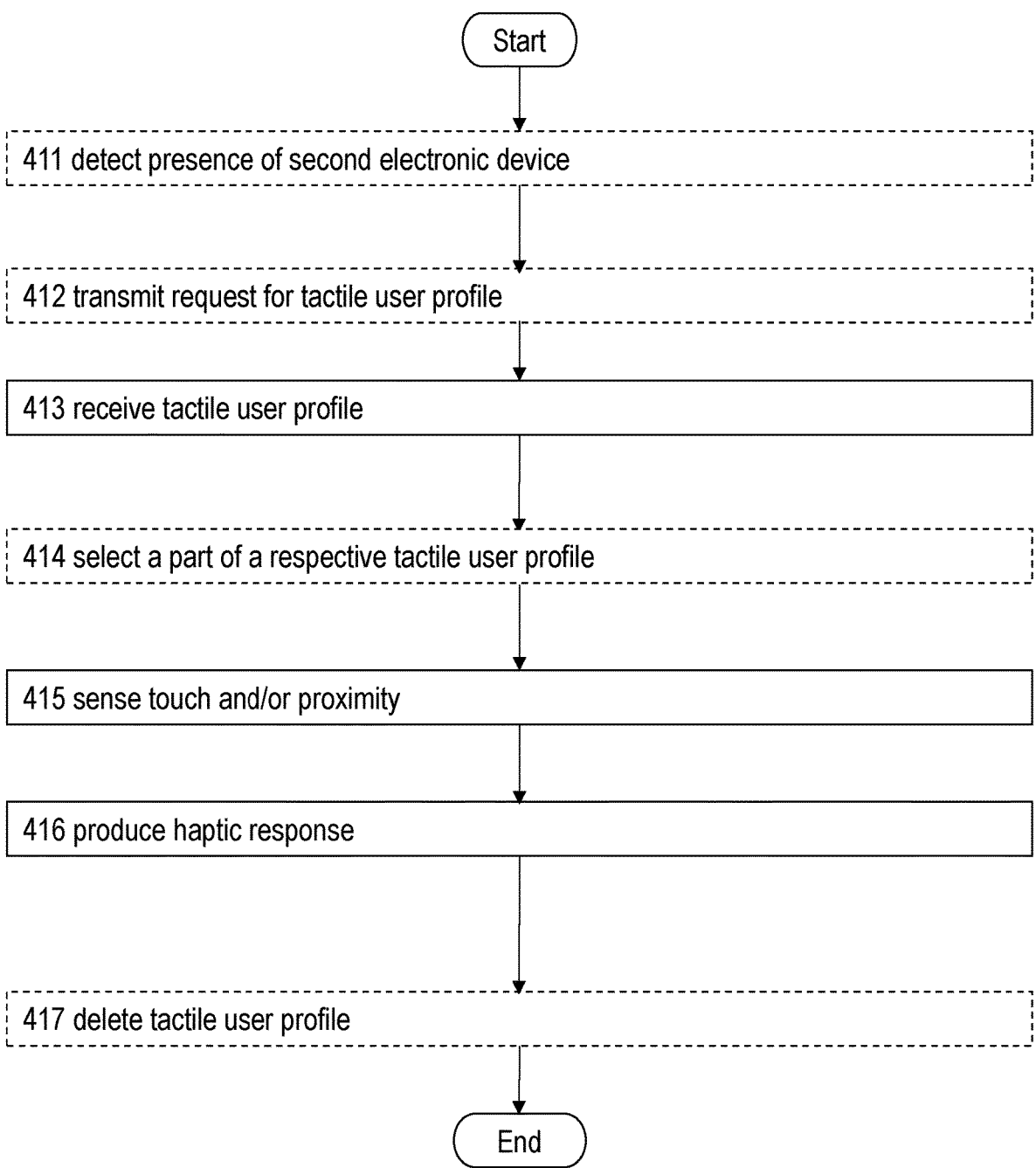
FIG. 4b is a flowchart illustrating an embodiment of a method performed by an electronic apparatus.

Exemplifying embodiments herein will now be described with reference to FIG. 4b and with further reference to FIGS. 1, 2 and 3. FIG. 4b illustrates a flowchart describing a method, performed by an electronic apparatus 100, 200a, for providing haptic feedback. The electronic apparatus 100, 200a comprises the interactive area 201a, 300 configured to provide one or more functions of the electronic apparatus 200a, 500.

Action 411

In some embodiments the electronic apparatus 100, 200a may detect the presence of a second electronic apparatus 200b. The electronic apparatus 100, 200a may base further actions on such detections as will be apparent when describing action 402 below.

Action 412

In some embodiments the electronic apparatus 100, 200a may transmit a request to download one or more tactile user profiles. The request may for example be sent to the second electronic apparatus 200b or the cloud 230 which may store the one or more tactile user profiles.

In some embodiments the electronic apparatus 100, 200a may detect the presence of the second electronic apparatus 200b and transmit the request for one or more tactile user profiles, e.g., in response thereto.

In some embodiments, the electronic apparatus 100, 200a may transmit the request to the second electronic apparatus 200b which in turn may request from the cloud 230 to download the one or more tactile user profiles to the electronic apparatus 100, 200a The electronic apparatus 100, 200a may share functional and haptic capabilities of the interactive area 201a-c, 300 with the second electronic apparatus 200b from which the one or more tactile user profiles are downloadable. For example, the electronic apparatus 100, 200a may share the functional and haptic capabilities of the interactive area 201a-c, 300 with the second electronic apparatus 200b in the request to download the one or more tactile user profile. By sharing the functional and haptic capabilities of the interactive area 201a-c, 300 with the second electronic apparatus 200b the electronic apparatus 100, 200a enables the second electronic apparatus 200b to e.g., select a part of a tactile user profile which can be implemented in the electronic apparatus 100, 200a. Other parts of the tactile user profile which cannot be implemented may not be needed.

Action 413

The electronic apparatus 100, 200a receives one or more tactile user profiles. As mentioned above, the respective tactile user profile defines one or more haptic responses produced from the interactive area 201a-c, 300. Further, the tactile user profile comprises associations between a respective function out of the one or more functions provided by the interactive area 201a-c, 300 and a corresponding haptic response.

If the electronic apparatus 100, 200a has transmitted information indicative of haptic and/or functional capabilities of the electronic apparatus 200a, 500, then in response thereto, the electronic apparatus 100, 200a may receive the one or more tactile user profiles matching the haptic and/or functional capabilities.

Action 414

The electronic apparatus 100, 200a may select a part of a respective tactile user profile based on functional and/or haptic capabilities of the electronic apparatus 200a, 500.

Action 415

The electronic apparatus 100, 200a senses the touch and/or the proximity of the object 303 interacting with the interactive area 201a-c, 300.

Action 416

The electronic apparatus 100, 200a produces a haptic response to sensing the touch and/or the proximity of the object 303 interacting with the interactive area 201a-c, 300.

The haptic response may correspond to one of the one or more functions provided by the interactive area 201a-c, 300 in response to the interaction with the interactive area 201a-c, 300 after the haptic response is provided. For example, the haptic response may correspond to a function triggered by the mechanical switch actuator 301.

The haptic response is produced depending on the function provided by the interactive area 201a-c, 300 and the one or more tactile user profiles.

Action 417

In some embodiments the electronic apparatus 100, 200a may delete a tactile user profile of a user if the electronic apparatus 200a, 500 doesn't register use of the interactive area 201a-c, 300 by that user for a certain time duration.

In some further embodiments the electronic apparatus 100, 200a may delete the tactile user profile if a host device, such as the second electronic apparatus 200b, is no longer connected, if the electronic apparatus 100, 200a is logged out from a specific person's account, or if it is detected that the user removes the electronic apparatus 100, 200a from his/her body. In some embodiments disclosed herein the electronic apparatus 100, 200a may detect that it is being used by several different people, e.g., since there are different profiles being loaded, and then the electronic apparatus 100, 200a proactively deletes a profile of a current user when detecting that the current user is no longer using it or likely to use it anymore. The detection may be dependent on some predicting means, e.g., based on a detection of a removal of the electronic apparatus 100, 200a from the second electronic apparatus 200b, or a distance to the second electronic apparatus 200b, etc.

Figure 4C:
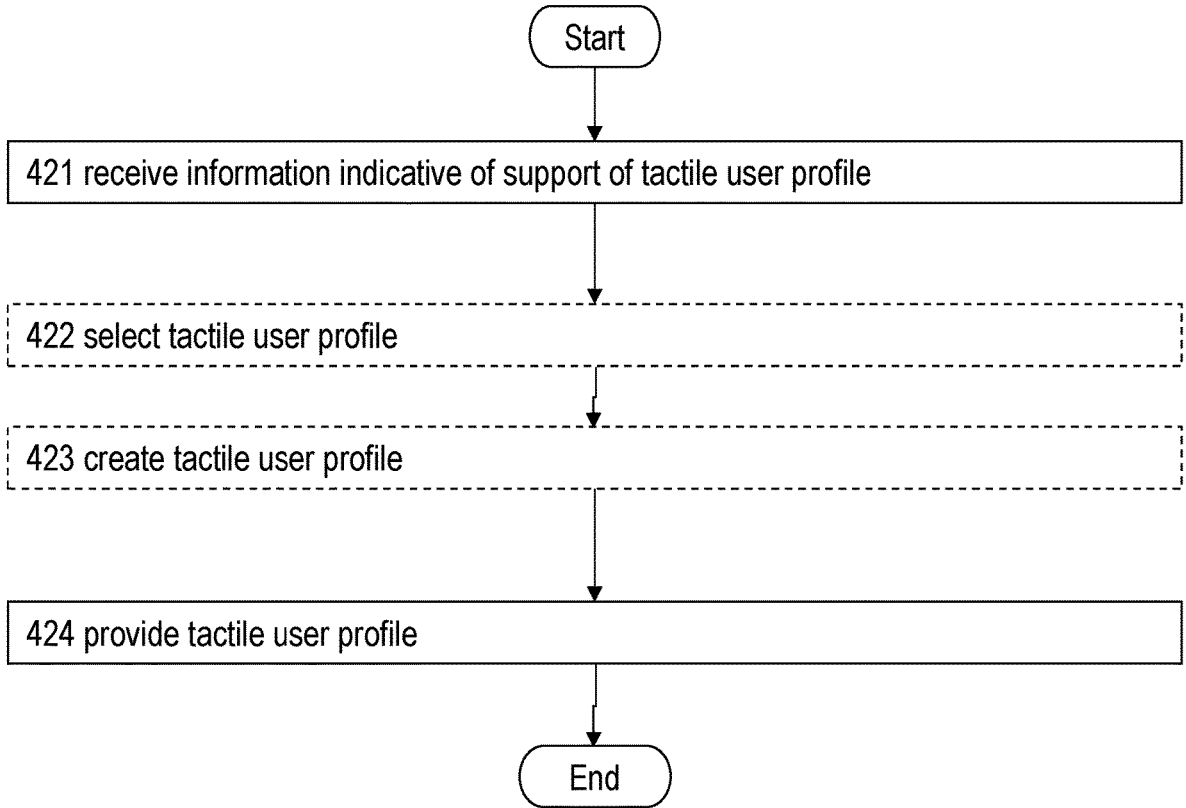
FIG. 4c is a flowchart illustrating an embodiment of a method performed by a second electronic apparatus.

Exemplifying embodiments herein will now be described with reference to FIG. 4c and with further reference to FIGS. 1, 2 and 3. FIG. 4c illustrates a flowchart describing a method, performed by the second electronic apparatus 200b, for assisting in providing haptic feedback from the first electronic apparatus 200a.

Action 421

In some embodiments the second electronic apparatus 200b may receive information, from the first electronic apparatus 200a, 500, indicative of support for one or more tactile user profiles defining one or more haptic responses produced from the interactive area 300 of the first electronic apparatus 200a, 500. As mentioned above, the tactile user profile comprises associations between a respective function out of one or more functions provided by the interactive area 201a-c, 300 and a corresponding haptic response.

In some embodiments the second electronic apparatus 200b may receive information indicative of haptic and/or functional capabilities of the first electronic apparatus 200a, 500 and, if no matching tactile user profile is obtainable, creating 413 a tactile user profile for the haptic and/or functional capabilities based on the received information indicative of haptic and/or functional capabilities of the first electronic apparatus 200a, 500.

Action 421 is related to action 412 above.

Action 422

In some embodiments the second electronic apparatus 200b may select a tactile user profile out of multiple tactile user profiles associated with a same specific function of the first electronic apparatus 200a, 500 based on the haptic capability of the first electronic apparatus 200a, 500.

Action 423

As mentioned above in action 421 the second electronic apparatus 200b may receive information indicative of haptic and/or functional capabilities of the first electronic apparatus 200a, 500. Then, if no matching tactile user profile is obtainable, the second electronic apparatus 200b may create a tactile user profile for the haptic and/or functional capabilities based on the received information indicative of haptic and/or functional capabilities of the first electronic apparatus 200a, 500.

Action 424

The second electronic apparatus 200b provides a tactile user profile to the first electronic apparatus 200a, 500. The tactile user profile is selected out of one or more selectable tactile user profiles based on tactile user profile information and based on functional and/or haptic capabilities of the first electronic apparatus 200a, 500.

In some embodiments providing the tactile user profile comprises providing a part of a respective selectable tactile user profile. Then the method may further comprise selecting the part based on the functional and/or haptic capabilities of the first electronic apparatus 200a, 500.

Figure 4D:
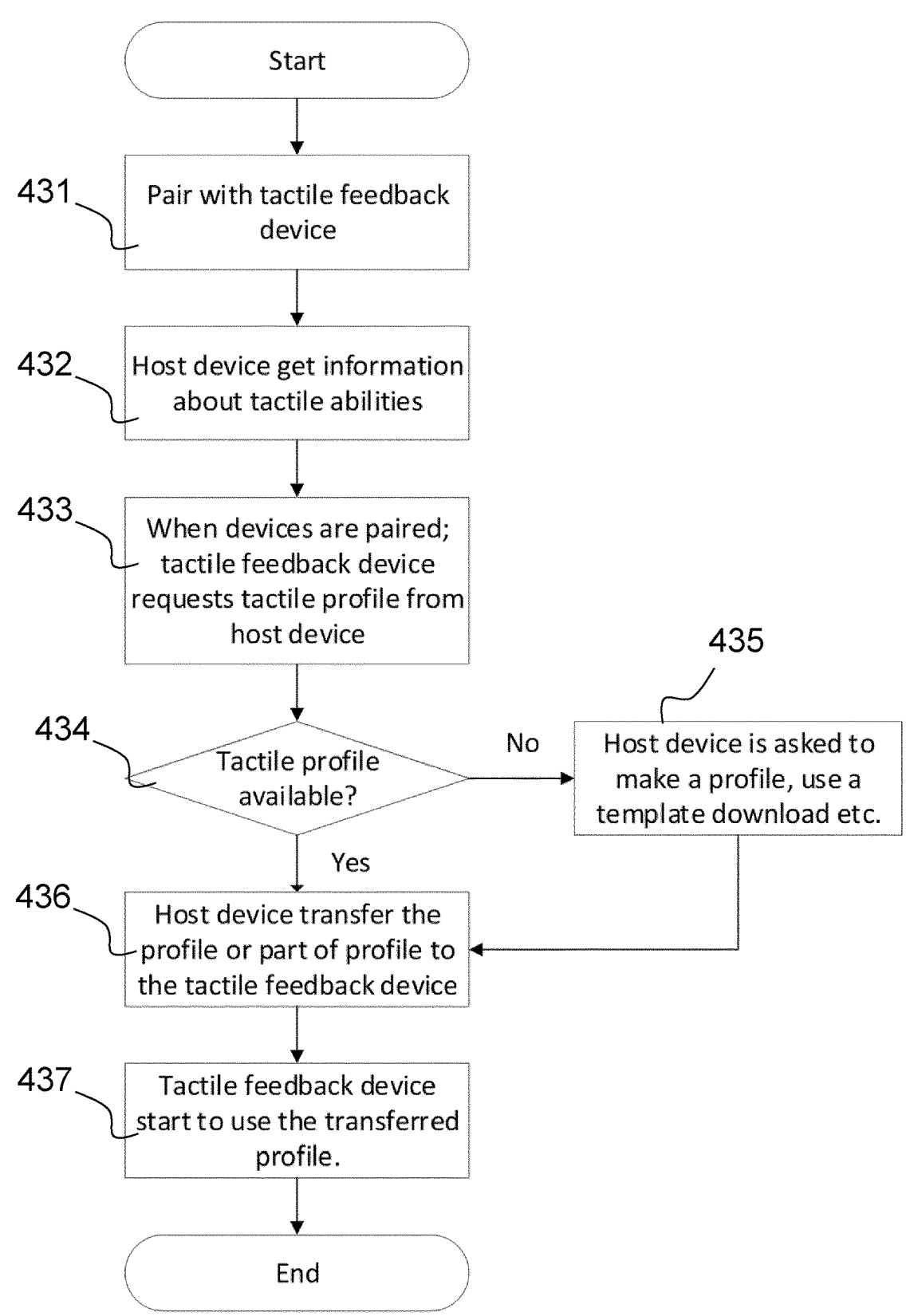
FIG. 4d is a flowchart illustrating an embodiment of a method performed by an electronic apparatus and a second electronic apparatus.

Further detailed exemplifying embodiments herein will now be described with reference to FIG. 4d and with further reference to FIGS. 1, 2 and 3. FIG. 4d illustrates a flowchart describing a method, performed by the first electronic apparatus 200a and/or the second electronic apparatus 200b, for transferring the tactile user profile to a tactile apparatus, such as the first electronic apparatus 200a.

In the following example embodiment, a tactile profile of a first user is stored in the second electronic apparatus 200b, here exemplified as a smart phone, and then the first user starts using the first electronic apparatus 200a, i.e., an apparatus with tactile feedback abilities, such as a pair of headphones, which is paired with the smart phone over Bluetooth. The second electronic apparatus 200b may be associated with the first user, for example by comprising a code, such as a code of a Subscriber Identity Module (SIM) card, that uniquely identifies the first user. In another example, the second electronic apparatus 200b may be associated with the first user, via a network identity, such as a google-account, or any other type of identity relating the second electronic apparatus 200b to the first user.

Below, also other alternative embodiments will be described.

Action 431

The first user may initiate pairing of a pair of headphones with the smart phone via Bluetooth. During the pairing process, when the device type is indicated by the first electronic apparatus 200a the first electronic apparatus 200a may also indicate whether or not it supports tactile feedback from interactive areas, such as buttons. If the support is not indicated during pairing, it may be indicated later e.g., in action 432 below.

Action 432

In some embodiments herein, the first electronic apparatus 200*a* may indicate whether or not it supports tactile feedback from interactive areas, such as buttons. The second electronic apparatus 200*b* may probe for such support or it may be explicitly indicated by the first electronic apparatus 200*a*.

Action 433

After pairing the first electronic apparatus 200*a* may request the tactile profile of the user. The first electronic apparatus 200*a* may either request the complete profile or request a part of the profile matching functions being supported by the first electronic apparatus 200*a*, such as the headphones.

Action 434

The smart phone checks whether or not the tactile profile of the first user is available. The tactile profile of the first user may for example be available in the second memory 216*b*, or in the cloud 230.

Action 435

If the tactile user profile is not available, the user may be asked to create one. Then the predefined tactile profile of the headphone manufacturer may be one alternative. The predefined tactile profile of the headphone manufacturer may e.g., be stored in the second memory 216*b* of the second electronic apparatus 200*b*. The predefined tactile profile of the headphone manufacturer may optionally be stored in the first memory 216*a* of the first electronic apparatus 200*a*. The second memory 216*b* may then be a non-volatile memory, such as a NOR memory, NAND memory, etc., so that the first electronic apparatus 200*a* may be operable without having to connect to an over-the-top service or rely on that the host device supports tactile profile creation. The predefined tactile profile of the headphone manufacturer may also be automatically requested over-the-top from a server, such as a server of a vendor.

In some embodiments disclosed herein there may be a default "old" tactile profile stored on the first electronic apparatus 200*a*, and if there is no new profile in the paired second electronic apparatus 200*b*, such as a smartphone, the first electronic apparatus 200*a* or the second electronic apparatus 200*a* may ask if the user wants to "update" the default tactile profile to a more recent default tactile profile over-the-top from the server.

The first user may also download a tactile user profile from the cloud 230 over a network, from another electronic apparatus, or create a tactile profile based on a set of different options.

Action 436

If the smart phone already has stored the tactile user profile of the first user, that profile is downloaded to the headphones. Either the whole tactile user profile is transferred or a part matching the functions available in the headset is transferred.

In some embodiments disclosed herein there is a tactile profile in the second electronic apparatus 200*b*, such as the smartphone, but the first electronic apparatus 200*a* has one or more new functions which are not represented in the old tactile profile. Then the user may be asked to create a tactile profile for the new functions or to get a default tactile profile only for those new functions from the server.

Action 437

When the first user starts using the headset, and moves her/his finger to the buttons, the first user will sense the tactile patterns of her/his profile, and immediately recognizes the pattern corresponding to "play", "pause", "skip forward", "volume up/down", etc.

If the first user switches to another set of headphones also supporting tactile buttons, her/his tactile profile may be loaded into those headphones as well as part of the pairing procedure and the first user gets exactly the same tactile pattern for the same functions.

If another second user borrows the headphones, those will instead be paired with an electronic device associated with the second user, such as the second user's smart phone, and a second tactile profile of the second user may be loaded into the headphones and stored in the first memory 216*a*. The second tactile profile may replace the first tactile profile or be added to the first tactile profile.

In another embodiment, the tactile profile of first user may be maintained as a profile on a network storage, such as the cloud 230, e.g., as an internet service or mobile edge cloud service. The first user may use the smart phone or a computer to update the tactile profile of the headphones. The new updated profile may automatically be updated in the network storage 230. When the first user logs in to another electronic apparatus, such as her/his XR headset, the tactile profile of the first user may be loaded from the network storage 230, and the first user gets familiar tactile patterns for all functions related to buttons on the XR headset. A user that logs in to an electronic apparatus logically binds the electronic apparatus to the user. This may be performed by specifying a user-id or an email and a password associated with the user-id or email, or by using a hardware token or Near Field Communication (NFC) coupling, or via fingerprint or face recognition to identify user and "logging in" user.

In another embodiment, the tactile profile may be stored in a user's smart watch exemplifying the second electronic apparatus 200*b*. The smart watch supports in-body communication. Also, the first electronic apparatus 200*a* with tactile buttons support in-body communication. When the user touches the first electronic apparatus 200*a* with the tactile buttons with a hand joined with a wrist on which the smart watch is worn, the smart watch automatically synchronizes the tactile profile of the user without giving out any other information about the user. Thereafter, the first electronic apparatus 200*a* maintains that tactile profile for its button functions until another second user is connected via the in-body communication and that second user's tactile profile is loaded into the first electronic apparatus 200*a*. The tactile profile of a user may also be deleted if the user has not used the buttons for a certain time duration. With this mechanism, the user can directly reach for any public device and immediately get her own tactile profile on its buttons without any pairing scheme in the same meaning as in Bluetooth for example. That is, the pairing may not need to be controlled or orchestrated by the user, such as for Bluetooth. Similar to an NFC connection-if the devices are close enough, there may be a connection (if it is clear that it is the user), and necessary information may be transmitted between the devices, but the devices need not be "paired" in the same meaning as in Bluetooth.

In some embodiments, smart wrist bands may be used as an alternative to the smart watch. Further, the smart watch and/or the smart bands may be worn on any of the hands.

In yet another embodiment, the same principle of operation as described above may apply but instead of in-body communication other very-short-range communication mechanisms may be used such as Near-Field Communication (NFC).

A key for the communication mechanism between the first electronic apparatus 200*a* and the second electronic apparatus 200*b* is that the first communication means 220*a* should be arranged within a very short distance of the second communications means 220b to avoid ambiguity of which user is approaching the first electronic apparatus 200a and soon to touch it. Further, there should be no complex pairing mechanism required for public devices. Exactly how such "implicit pairing" may be implemented and how a tactile profile may be pushed and activated before a first touch of the first electronic apparatus 200a is beyond the scope of this disclosure. "Implicit pairing" may mean that there does not have to be a pairing procedure that has to be somehow controlled or orchestrated by the user. Instead, pairing may be automatically handled in a background as an automatic procedure by the second electronic apparatus 200b and the first electronic apparatus 200a, such as a device of the user and a target device to be used.

In some embodiments XR glasses with directional Bluetooth may be used to identify the first electronic apparatus 200a. For example, the user may direct interaction towards the first electronic apparatus 200a which is then identifiable using said Bluetooth technology.

In another embodiment, the user's tactile profile may be stored in the second electronic apparatus 200b carried or worn by said user, and the spatial nearness of said user to the nearby first electronic apparatus 200a will allow for the tactile profile to be shared from the second electronic apparatus 200b using near field communication such as NFC, Bluetooth, data-over-audio communication such as ultrasonic technology, etc. Such a mechanism may be excellent for a steering wheel or control panel in a car, where another person in the car may pair his/her smart phone with the cars infotainment system. With such an approach, the driver of the car gets well-known tactile patterns for the buttons of the steering wheel and control panel, whereas other people in the car may still pair their devices with the infotainment system.

The tactile profile may be stored in any personal electronic device that may store a tactile profile. Typically, the personal electronic device may be worn, kept, carried, or owned by a user. The personal electronic device may be an RFID tag, or a credit card as long as it is equipped with a communication interface and a memory. The personal electronic device may be passive or active.

In a similar way the personal profile may adjust the tactile pattern of electronic apparatuses used by many people, for example home appliances according to each person's personal profile. A person may share his/her tactile profile—either the complete set or only a new pattern—with friends via social media. It may also be possible to download (free or at a cost at a marketplace) new tactile profiles as they arrive. When the hardware technology evolves, and there are more advanced patterns possible (for example higher resolution, temperature patterns, more height possible, etc.), the initial tactile profile may be an "automatic mapping" of the previous personal pattern onto the new hardware, but then the user may want to modify or replace some of the patterns given the new opportunity. In those cases, a user may have two versions of the tactile profile for a period during which there are two significant different generations of tactile buttons with inherently different capabilities.

It is possible that different apparatuses supporting tactile feedback use different types of technologies and thereby have different capabilities in the generation of tactile patterns. Hence, the "play" tactile feedback may not be exactly the same for different kinds of tactile technologies. For example, the tactile feedback may vary in resolution, amplitudes, speed, etc. This may be handled in different ways. In one embodiment, the profile supports different types or classes of tactile technologies, and each function corresponds to multiple tactile patterns, each tactile pattern corresponding to a respective tactile technology. The second electronic apparatus 200b e.g., the host device, may select a tactile pattern out of multiple tactile patterns associated with a specific function based on the tactile capability of the first electronic apparatus 200a, such as a peripheral device. The different patterns for the same function, e.g., "play", may feel similar as selected by the user, so the user recognizes the function even if the tactile pattern changes somewhat between different electronic apparatuses. Then, at the pairing of the first electronic apparatus 200a, a tactile technology class of that electronic apparatus may be indicated to the second electronic apparatus 200b, and an appropriate profile is then provided from the second electronic apparatus 200b or profile server 230.

The tactile technology class may define a predefined limited set of functions, e.g. a headset. Some devices may have a subset of those functions, other devices may have the complete set of functions. The tactile technology class may also be dependent on the capabilities of the tactile buttons as different tactile button technologies may require updated tactile profiles. In other words, the tactile technology class may be based on what kind of functionality a device supports. Overlapping profiles may exist, such as: headset, media player, presentation controller, tv remote, volume controller, light switch, etc.

In yet another embodiment, all patterns related to the functions may be provided to the first electronic apparatus 200a, but only the patterns matching the tactile technology of the first electronic apparatus 200a will be stored and used by the first electronic apparatus 200a.

The indication of the tactile technologies for this purpose may be a bit-field in the tactile pattern for a specific function.

In some embodiments, if there is no tactile pattern for a specific first tactile technology supported by the first electronic apparatus 200a but there are tactile patterns for other tactile technologies, then there may be a function in the second electronic apparatus 200b, the tactile pattern server 230, or the first electronic apparatus 200a that translates a stored tactile pattern to a tactile pattern that is supported by the first tactile technology so that the tactile pattern feels similar to the stored tactile pattern but based on the resolution, amplitude, etc. of the actual first tactile technology supported.

Figure 4E:
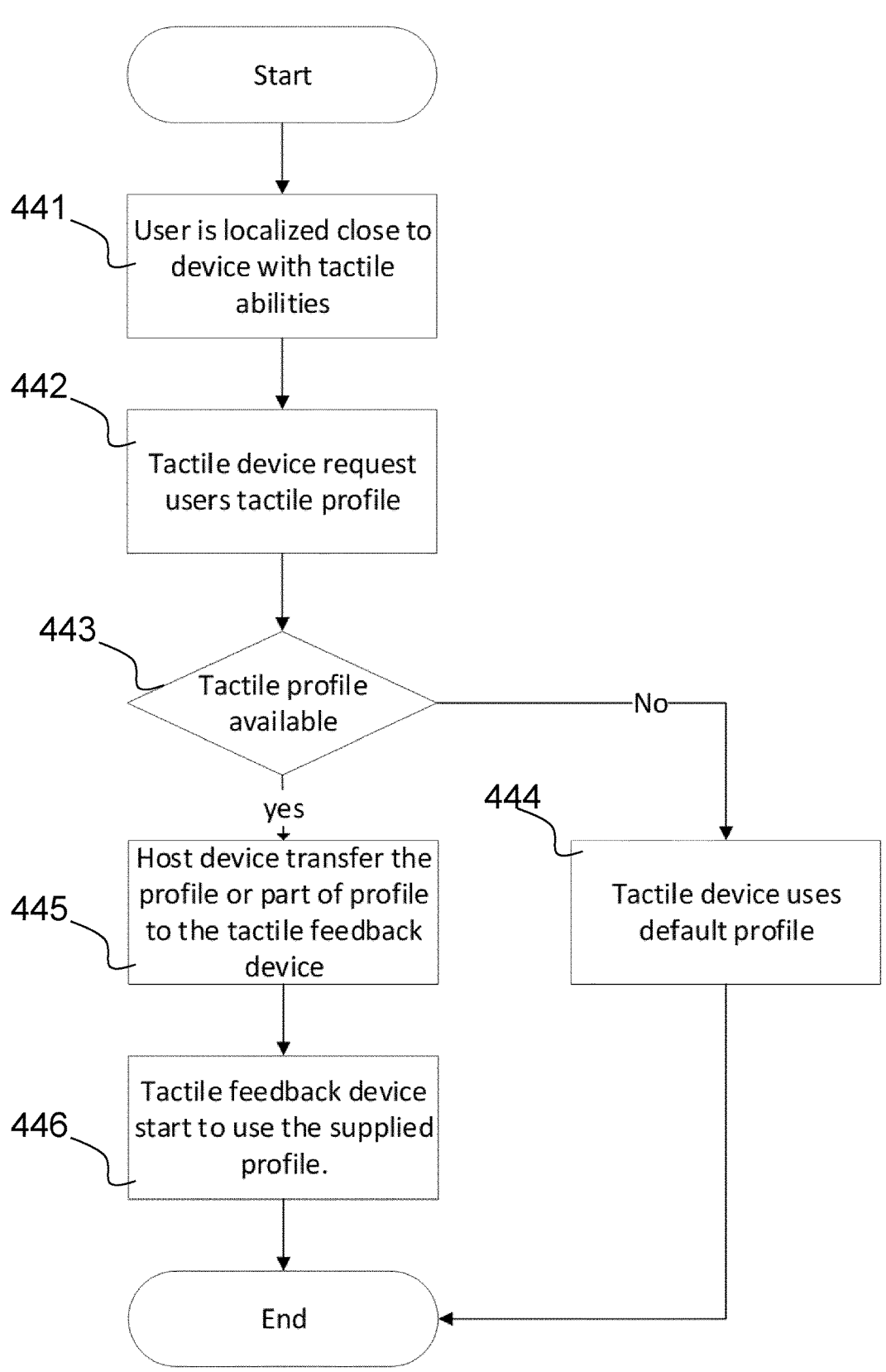
FIG. 4e is a flowchart illustrating an embodiment of a method performed by an electronic apparatus and a second electronic apparatus.

Further detailed exemplifying embodiments herein will now be described with reference to FIG. 4e and with further reference to FIGS. 1, 2 and 3. FIG. 4e illustrates a flowchart describing a method, performed by the first electronic apparatus 200a and/or the second electronic apparatus 200b, for proximity-based tactile profile synchronization.

In some embodiments below, the second electronic apparatus 200b may be exemplified by a smart watch the user wears or a smart phone that the user carries.

However, embodiments herein apply also to when the first electronic apparatus 200a with tactile buttons is not paired with a specific second electronic apparatus 200b but with a second electronic apparatus 200b that may be used by any person.

Action 441

The first electronic apparatus 200a and/or the second electronic apparatus 200b may detect when the user or the second electronic apparatus 200b is located close to the first electronic apparatus 200a, for example within a threshold distance from the first electronic apparatus 200a.

Action 442

If the user is within a short distance from the first electronic apparatus 200*a*, such as e.g., a loudspeaker, infrastructure equipment, etc., the first electronic apparatus 200*a* discovers the proximity of the user's device, that is of the second electronic apparatus 200*b* as described above. In another embodiment, the second electronic apparatus 200*b* may indicate the proximity to the first electronic apparatus 200*a*.

The first electronic apparatus 200*a* may then request the tactile user profile of the user from the second electronic apparatus 200*b*. That is, the first electronic apparatus 200*a* may probe the second electronic apparatus 200*b* for the availability of a tactile profile-potentially limited to a few functions available in the first electronic apparatus 200*a*.

Action 443

The second electronic apparatus 200*b* may then determine whether or not the requested tactile user profile is available.

Action 444

If the requested tactile user profile is not available e.g., at the second electronic apparatus 200*b* and/or the cloud 230 then the first electronic apparatus 200*a* may use a default tactile user profile.

Action 445

If such a tactile user profile is available, it is loaded into the first electronic apparatus 200*a* and readily available at the touch by that user. In other words, the second electronic apparatus 200*b* may transfer, or initiate transfer from the cloud 230 of, the tactile user profile or a part of it to the first electronic apparatus 200*a*.

Action 446

When the tactile user profile has been transferred the first electronic apparatus 200*a* may start to use the supplied tactile user profile.

In another embodiment, a set of such tactile user profiles may be stored in the first electronic apparatus 200*a*. By recognizing or determining an identity of the user or of the second electronic apparatus 200*b* associated with the identity of the user, as described above in relation to action 441, a correct tactile profile, corresponding to the tactile user profile associated with the identity of the user, is used by the first electronic apparatus 200*a*. Then actions 442-445 may be skipped.

One example of determining proximity of and interacting with a specific first electronic apparatus 200*a* (not necessarily tied to a specific user) may be a user wearing XR glasses including directional Bluetooth where said user is directing interaction towards the first electronic apparatus 200*a* that may be identifiable using said Bluetooth technology.

Context-Dependent Tactile Profiles

Besides the above-described function-related tactile feedback, there are situations where certain tactile profiles may depend on a context, that is in which context the tactile electronic apparatus 100 is used. Then specific context-dependent tactile patterns may overrule at least a part of, or be added to, the tactile patterns which are comprised in the existing tactile user profile. For example, in a bumpy car ride with a lot of movement the profile may provide more enhanced tactile patterns making it easier to feel them in the context, etc.

In some example embodiments multiple tactile user devices, such as the electronic apparatus 100, may be located within a specific area in which a venue takes place. The venue may be a concert where songs are played. Then tactile user profiles may be transferred or pushed to the multiple or all tactile electronic apparatuses 100. The transferred tactile user profiles may override the stored tactile user profiles on the electronic apparatuses 100 such that all tactile electronic apparatuses 100 produces the same tactile feedback to the users. Said tactile feedback may be synchronized in time for all users to match the current beat of a played concert song. The electronic apparatus 100 may be a wristband or a watch having tactile feedback capabilities. The tactile feedback may be synchronized to the beat to enhance the tactile feedback. The tactile output may be on an inside of the wristband or the watch such that it is always touching the user wearing it.

In another embodiment, a distributed team of users being on the same VR space may agree on certain tactile feedback for device button functions or other tactile actuators which make sense for their common scenario in their VR session. This may be a context-dependent addition on top of their existing private profile.

The context-dependent additional tactile profile may be time-limited to that joint session. The additional tactile profile may also be stored and used also at later sessions in the same team.

When playing a VR game, the user may want to relate certain functions to dynamic buttons on the headset or clothes. The dynamic buttons are distinguishable by the tactile feedback. The tactile user profile may be re-loaded as an additional context-dependent profile when the user returns to the same VR situation.

A key aspect of embodiments herein is ease of use of the tactile user profiles-meaning that the process is automatic and instant for the user. When tactile buttons become common it is unrealistic to believe that the same user will keep track of many different patterns for similar functions between different devices, and the proposed embodiments enable autonomous synchronization of personal tactile profiles in the background with minimum involvement of the user.

Figure 5:
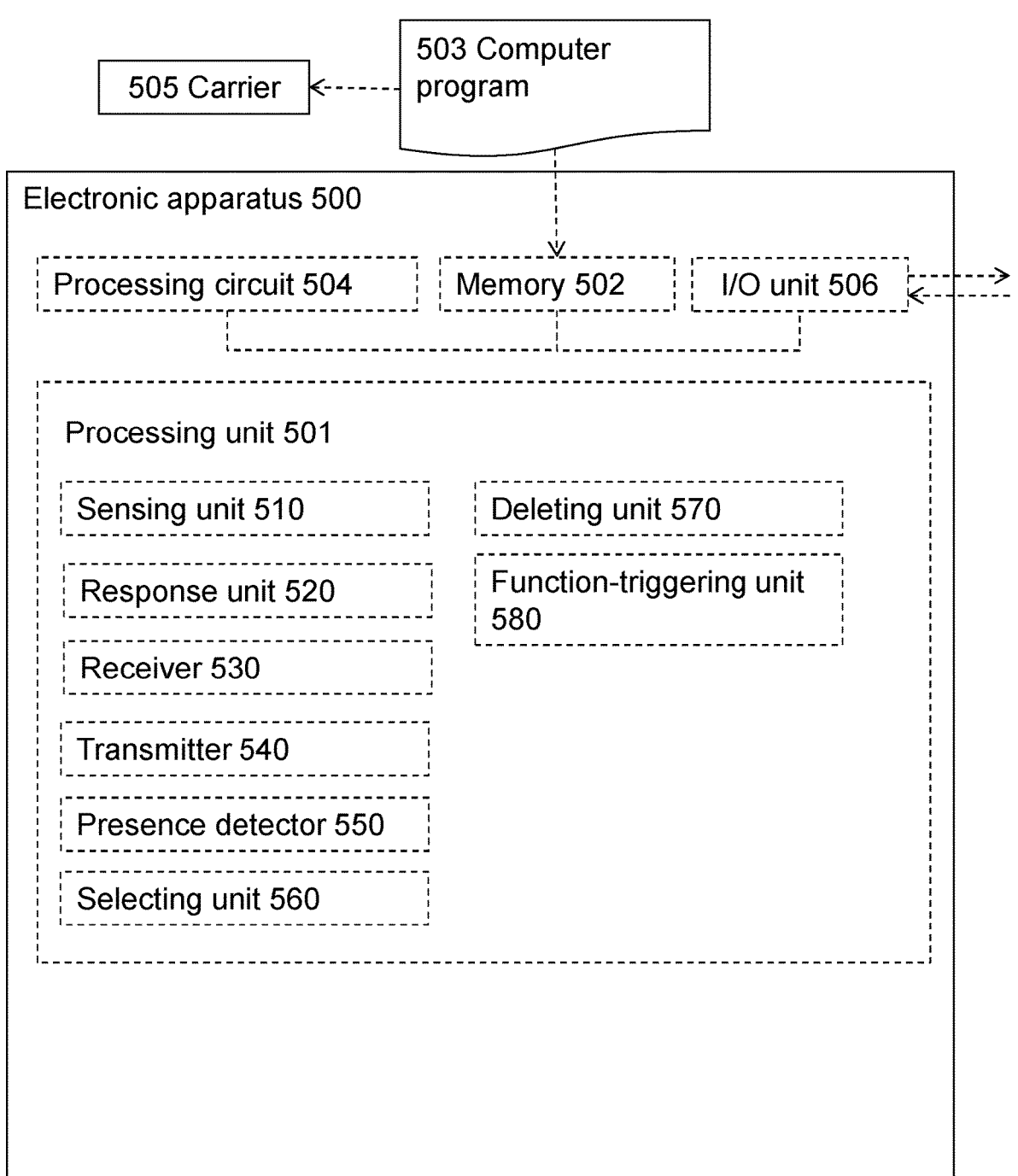
FIG. 5 is a block diagram illustrating an embodiment of the electronic apparatus.

FIG. 5 illustrates a schematic block diagram of embodiments of an electronic apparatus 500 which corresponds to the electronic apparatus 100 of FIG. 1 or the first electronic apparatus 200*a* of FIG. 2.

As mentioned above, the electronic apparatus 500 comprises the interactive area 201*a-c*, 300 configured to provide one or more functions of the electronic apparatus 500. The interactive area 201*a-c*, 300 may be part of an Input and Output (I/O) unit 506. The I/O unit 506 may be part of a user interface. The I/O unit 506 may comprise or be configured to communicate with e.g., the button 300, the mechanical switch actuator 301, the sensing unit 302 and the responsive material structure 304.

The electronic apparatus 500 may further comprise a processing unit 501 comprising circuitry configured for performing the above method actions performed by the electronic apparatus 500. The processing unit 501 may be programmable.

The processing unit 501 may comprise a sensing unit 510 configured to, e.g., sense the touch and/or the proximity of the object 303 interacting with the interactive area 201*a-c*, 300, such as the button 300.

The processing unit 501 may comprise a response unit 520 configured to produce the haptic response from the interactive area 201*a-c*, 300 to sensing the touch and/or the proximity of the object 303, i.e., to provide haptic feedback to the object 303. The response unit 520 may also be referred to as a haptic unit.

The processing unit 501 may further comprise circuitry configured to urge the response unit 520 to produce the haptic response. The haptic response corresponds to one of the one or more functions provided by the interactive area 201a-c, 300 in response to the interaction with the interactive area 201a-c, 300 after the haptic response is provided The processing unit 501 may further comprise a receiver 530 which is configured for receiving one or more tactile user profiles. As mentioned above, the respective tactile user profile defines one or more haptic responses produced from the interactive area 201a-c, 300 by the response unit 304. The tactile user profile comprises associations between the respective function out of the one or more functions provided by the interactive area 201a-c, 300 and a corresponding haptic response.

In some embodiments the one or more tactile user profiles are stored in a location outside of the electronic apparatus 500. Then the electronic apparatus 500 may be configured to, e.g., by the receiver 530 being configured to, download the one or more tactile user profiles from the location outside of the electronic apparatus 500.

The processing unit 501 may further comprise a transmitter 540 configured for transmitting a request to download the one or more tactile user profiles.

The electronic apparatus 500 may further be configured to, e.g., by the transmitter 540 being configured to, share functional and haptic capabilities of the interactive area 201a-c, 300 with the second electronic apparatus 200b from which the one or more tactile user profiles are downloadable.

In some embodiments the electronic apparatus 500 may be further configured for, e.g., by the receiver 530 being configured for, receiving a request to download the one or more tactile user profiles from the electronic apparatus 500, and for, e.g., by the transmitter 540 being configured for, transmitting the one or more tactile user profiles to the second electronic apparatus 200b.

The I/O unit 506 may comprise or be configured to communicate with e.g., the first communications means 220a and/or the receiver 530 and/or the transmitter 540.

In some embodiments the receiver 530 is further configured for receiving a request to download the one or more tactile user profiles from the electronic apparatus 500. Then the transmitter 520 may be configured for transmitting the one or more tactile user profiles to the second electronic apparatus 200b.

The electronic apparatus 500 may further be configured to, e.g., by the transmitter 540 being configured to, transmit information indicative of haptic and/or functional capabilities of the electronic apparatus (200a, 500). In response thereto, the electronic apparatus 500 may be configured to, e.g., by the receiver 530 being configured to, receive the one or more tactile user profiles matching the haptic and/or functional capabilities.

The processing unit 501 may further comprise a presence detector 550. The electronic apparatus 500 may further be configured to, e.g., by the presence detector 550 being configured to, detect the presence of the second electronic apparatus 200b, and e.g., by the transmitter 540 being configured to, transmit the request for the one or more tactile user profiles.

The processing unit 501 may further comprise a selecting unit 560. The electronic apparatus 500 may further be configured to, e.g., by the selecting unit 560 being configured to, select a part of the respective tactile user profile based on the functional and/or haptic capabilities of the electronic apparatus 500.

The processing unit 501 may further comprise a deleting unit 570. The electronic apparatus 500 may further be configured to, e.g., by the deleting unit 570 being configured to, delete the tactile user profile of the user if the electronic apparatus 500 doesn't register use of the interactive area 201a-c, 300 by that user for a certain time duration.

The processing unit 501 may further comprise a function-triggering unit 580 to, e.g., trigger a function related to the button 300 and/or trigger the function in response to the mechanical switch actuator 301 being actuated.

Figure 6:
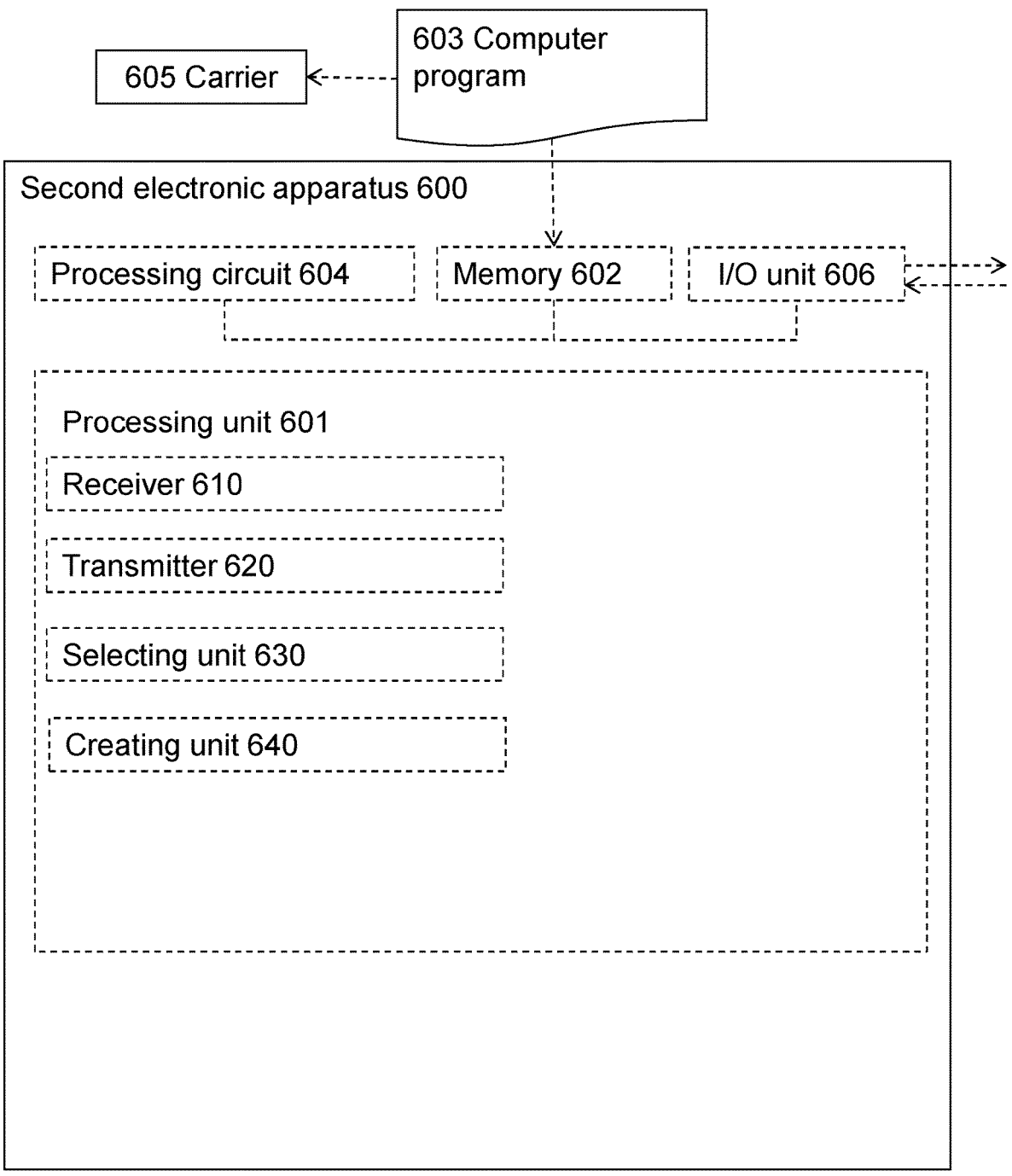
FIG. 6 is a block diagram illustrating an embodiment of the second electronic apparatus.

FIG. 6 illustrates a schematic block diagram of embodiments of a second electronic apparatus 600 corresponding to the second electronic apparatus 200b in FIG. 2.

The second electronic apparatus 600 is configured to assist in providing haptic feedback from the first electronic apparatus 200a.

The second electronic apparatus 600 may comprise a processing unit 601 comprising circuitry configured for performing the actions by the second electronic apparatus 600 described above. The processing unit 601 may be programmable.

The processing unit 601 may further comprise a receiver 610. The receiver 610 may be part of the second communications means 220b. The processing unit 601 may further comprise a transmitter 620. The transmitter 620 may be part of the second communications means 220b.

To perform the method actions above, the second electronic apparatus 200b, 600 may comprise an Input and Output (I/O) unit 606. The I/O unit 606 may be part of a user interface and may comprise or be configured to communicate with e.g., the second communications means 220b and/or the receiver 530 and/or the transmitter 540.

The second electronic apparatus 600 is further configured to, e.g., by means of the processing unit 601 being configured to, and in particular the receiver 610 being configured to, receive information, from the first electronic apparatus 200a, 500, indicative of the support for the one or more tactile user profiles defining the one or more haptic responses produced from the interactive area 300 of the first electronic apparatus 200a, 500. As mentioned above, the tactile user profile comprises associations between the respective function out of the one or more functions provided by the interactive area 201a-c, 300 and the corresponding haptic response.

The second electronic apparatus 600 is further configured to, e.g., by means of the processing unit 601 being configured to, and in particular the transmitter 620 being configured to, provide the tactile user profile to the first electronic apparatus 200a, 500. The tactile user profile is selected out of the one or more selectable tactile user profiles based on the tactile user profile information and based on the functional and/or haptic capabilities of the first electronic apparatus 200a, 500.

The processing unit 601 may further comprise a selecting unit 630. Thus, the second electronic apparatus 600 may further be configured to, e.g., by means of the processing unit 601 being configured to and in particular the selecting unit 630 being configured to, select the tactile user profile out of the one or more selectable tactile user profiles based on the tactile user profile information and based on the functional and/or haptic capabilities of the first electronic apparatus 200a, 500.

In some embodiments the second electronic apparatus 600 is further configured to, e.g., by means of the processing unit 601 being configured to, select the tactile user profile out of the multiple tactile user profiles associated with the same specific function of the first electronic apparatus 200a, 500 based on the haptic capability of the first electronic apparatus 200a, 500.

In some embodiments the second electronic apparatus 600 is further configured to, e.g., by means of the processing unit

601 being configured to and in particular the transmitter 620 being configured to, provide the tactile user profile by providing a part of the respective selectable tactile user profile. Then the second electronic apparatus 600 may be further configured to, e.g., by means of the processing unit 601 being configured to and in particular the selecting unit 630 being configured to, select the part based on the functional and/or haptic capabilities of the first electronic apparatus 200a, 500.

In some embodiments the second electronic apparatus 600 is further configured to, e.g., by means of the processing unit 601 being configured to and in particular the receiver 610 being configured to, receive information indicative of the haptic and/or functional capabilities of the first electronic apparatus 200a, 500.

Then, based on the information received, if no matching tactile user profile is obtainable, the second electronic apparatus 600 is further configured to, e.g., by means of the processing unit 601 being configured to and in particular a creating unit 640 of the processing unit 601 being configured to, create a tactile user profile for the haptic and/or functional capabilities.

The embodiments herein may be implemented by a processing circuit 504, 604 e.g., comprising one or more processors, in the electronic apparatus 100, 200a, 500 depicted in FIG. 5, and in the second electronic apparatus 200b, 600 depicted in FIG. 6, together with computer program code, e.g., computer program 503, 603, for performing the functions and actions of the embodiments herein. The program code mentioned above may also be provided as a computer program product, for instance in the form of a data carrier carrying computer program code for performing the embodiments herein when being loaded into the electronic apparatus 100, 200a, 500 and in the second electronic apparatus 200b, 600. One such carrier may be in the form of a CD ROM disc. It is however feasible with other data carriers such as a memory stick. The computer program code may furthermore be provided as pure program code on a server and downloaded to the electronic apparatus 100, 200a, 500 and in the second electronic apparatus 200b, 600.

The electronic apparatus 100, 200a, 500 and the second electronic apparatus 200b, 600 may further comprise a respective memory 502, 602 comprising one or more memory units. The memory 502, 602 comprises instructions executable by the processing circuit in the electronic apparatus 100, 200a, 500 and in the second electronic apparatus 200b, 600. The memory 502, 602 is arranged to be used to store e.g., information, indications, data, configurations, and applications to perform the methods herein when being executed in the electronic apparatus 100, 200a, 500 and in the second electronic apparatus 200b, 600. Specifically, the memory 502, 602 may store the tactile user profiles. The memory 502, 602 may further store the functional and/or haptic capabilities of the first electronic apparatus 200a, 500.

In some embodiments, a computer program 503, 603 comprises instructions, which when executed by the processing circuit 504, 604 cause the processing circuit 504, 604 of the electronic apparatus 100, 200a, 500 and the second electronic apparatus 200b, 600 to perform any of the method actions above.

In other words, a computer program product 503, 603 may comprise computer program code for performing the methods above when said computer program code is executed by the programmable processing unit 501 of the electronic apparatus 500, or for performing the methods above when said computer program code is executed by the programmable processing unit 601 of the second electronic apparatus 600.

In some embodiments, a computer readable medium 505, 605 stores the computer program product 503, 603. The computer readable medium 505, 605 may also be referred to as a carrier 505, 605 comprising the respective computer program 503, 603. The carrier 505, 605 may be one of an electronic signal, an optical signal, an electromagnetic signal, a magnetic signal, an electric signal, a radio signal, a microwave signal, or a computer-readable storage medium.

Those skilled in the art will appreciate that the modules and/or units in the electronic apparatus 100, 200a, 500 and the second electronic apparatus 200b, 600 described above may refer to a combination of analog and digital circuits, and/or one or more processors configured with software and/or firmware, e.g., stored in the electronic apparatus 100, 200a, 500, and the second electronic apparatus 200b, 600, that when executed by, e.g., the processing circuit 504, 604 above causes the electronic apparatus to perform the method actions above. The processing circuit 504, 604 as well as the other digital hardware, may be included in a single Application-Specific Integrated Circuitry (ASIC), or several processors and various digital hardware may be distributed among several separate components, whether individually packaged or assembled into a system-on-a-chip (SoC).

As used herein, the term "module" or "unit" may refer to one or more functional modules, each of which may be implemented as one or more hardware modules and/or one or more software modules and/or a combined software/hardware module. In some examples, the module may represent a functional unit realized as software and/or hardware.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software, or a combined hardware-software module, may be a connecting means, providing means, configuring means, responding means, disabling means or the like as disclosed herein. As an example, the expression "means" may be a module corresponding to the modules listed above in conjunction with the figures.

As used herein, the term "software module" may refer to a software application, a Dynamic Link Library (DLL), a software component, a software object, an object according to Component Object Model (COM), a software component, a software function, a software engine, an executable binary software file or the like.

The terms "processing module" or "processing circuit" may herein encompass a processing unit, comprising e.g., one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity, or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, Random Access Memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the terms "number" and/or "value" may be any kind of number, such as binary, real, imaginary, or rational number or the like. Moreover, "number" and/or "value" may be one or more characters, such as a letter or a string of letters. "Number" and/or "value" may also be represented by a string of bits, i.e., zeros and/or ones.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. An electronic apparatus comprising:
an interactive area configured to provide one or more functions of the electronic apparatus;
a sensing unit configured to sense a touch and/or a proximity of an object interacting with the interactive area;
a response unit configured to produce a tactile response from the interactive area to sensing the touch and/or the proximity of the object;
a processing unit comprising circuitry configured to urge the response unit to produce the tactile response, wherein the tactile response corresponds to one of the one or more functions provided by the interactive area in response to an interaction with the interactive area after the tactile response is provided;
a transmitter for transmitting a request for one or more tactile user profiles; and
a receiver configured for receiving the requested one or more tactile user profiles, wherein
a respective tactile user profile defines one or more tactile responses produced from the interactive area by the response unit, and the respective tactile user profile comprises associations between a respective function out of the one or more functions provided by the interactive area and a corresponding tactile response.

2. The electronic apparatus according to claim 1, wherein the tactile user profile comprises associations between the respective function provided by the interactive area and the corresponding tactile response in the form of a tactile pattern.

3. The electronic apparatus according to claim 1, wherein the tactile user profile comprises associations between the respective function provided by the interactive area and the corresponding tactile response combined with a further sensory response.

4. The electronic apparatus according to claim 1, wherein the tactile user profile is a default tactile user profile associated with the electronic apparatus.

5. The electronic apparatus according to claim 1, wherein the tactile user profile is a default tactile user profile associated with a user of the electronic apparatus.

6. The electronic apparatus according to claim 1, wherein the tactile user profile is one of a number of predefined tactile user profiles.

7. The electronic apparatus according to claim 1, wherein the one or more tactile user profiles are stored in a location outside of the electronic apparatus, and wherein the one or more tactile user profiles are downloadable to the electronic apparatus from the location outside of the electronic apparatus.

8. The electronic apparatus according to claim 1, wherein the electronic apparatus shares functional and haptic capabilities of the interactive area with a second electronic apparatus from which the one or more tactile user profiles are downloadable.

9. The electronic apparatus according to claim 1, wherein the receiver is further configured for receiving a request to download the one or more tactile user profiles from the electronic apparatus and wherein the transmitter is configured for transmitting the one or more tactile user profiles to the second electronic apparatus.

10. The electronic apparatus according to claim 1, wherein the electronic apparatus is any of a wireless communication device, tablet, a TV, a monitor, a headset, electronic eyewear, an alarm clock, a car, or an audio player.

11. A method for providing haptic feedback in an electronic apparatus comprising an interactive area configured to provide one or more functions of the electronic apparatus, the method comprising:
transmitting a request for one or more tactile user profiles;
receiving the requested one or more tactile user profiles, wherein a respective tactile user profile defines one or more tactile responses produced from the interactive area and wherein the tactile user profile comprises associations between a respective function out of the one or more functions provided by the interactive area and a corresponding tactile response;
sensing a touch and/or a proximity of an object interacting with the interactive area; and
producing a tactile response to sensing the touch and/or the proximity of the object interacting with the interactive area, wherein the tactile response corresponds to one of the one or more functions provided by the interactive area in response to an interaction with the interactive area after the tactile response is provided and wherein the tactile response is produced depending on the function provided by the interactive area and the one or more tactile user profiles.

12. The method according to claim 11, comprising detecting the presence of a second electronic apparatus and transmitting a request for one or more tactile user profiles.

13. A second electronic apparatus configured to assist in providing haptic feedback from a first electronic apparatus and comprising:

a processing unit comprising circuitry configured to:

receive, from the first electronic apparatus, a request for at least one tactile user profile, the request comprising information indicative of support for one or more tactile user profiles;

in response to the request, select or create at least a first tactile user profile from a set of tactile user profiles based on functional and/or haptic capabilities of the first electronic apparatus; and provide to the first electronic apparatus the selected or created first tactile user profile, wherein the first tactile user profile provided to the first electronic apparatus defines one or more tactile responses produced from an interactive area of the first electronic apparatus, and the first tactile user profile provided to the first electronic apparatus comprises associations between a respective function out of one or more functions provided by the interactive area and a corresponding tactile response.

14. The second electronic apparatus according to claim 13, wherein the processing unit is further configured to select a tactile user profile out of multiple tactile user profiles associated with a same specific function of the first electronic apparatus based on the haptic capability of the first electronic apparatus.

15. The second electronic apparatus according to claim 13, wherein the processing unit is further configured to receive information indicative of haptic and/or functional capabilities of the first electronic apparatus and based on the information received, if no matching tactile user profile is obtainable, create a tactile user profile for the haptic and/or functional capabilities.

16. A method performed by a second electronic apparatus for assisting in providing haptic feedback from a first electronic apparatus, the method comprising:

receiving, from the first electronic apparatus, a request for at least one tactile user profile, the request comprising information indicative of support for one or more tactile user profiles;

in response to the request, selecting or creating at least a first tactile user profile from a set of tactile user profiles based on functional and/or haptic capabilities of the first electronic apparatus; and providing to the first electronic apparatus the selected or created first tactile user profile, wherein the first tactile user profile provided to the first electronic apparatus defines one or more tactile responses produced from an interactive area of the first electronic apparatus, and the first tactile user profile provided to the first electronic apparatus comprises associations between a respective function out of one or more functions provided by the interactive area and a corresponding tactile response.

17. The method according to claim 16, comprising receiving information indicative of haptic and/or functional capabilities of the first electronic apparatus and, if no matching tactile user profile is obtainable, creating a tactile user profile for the haptic and/or functional capabilities of the first electronic apparatus based on the received information indicative of haptic and/or functional capabilities of the first electronic apparatus.

* * * * *